(12) United States Patent  
Browne et al.

(10) Patent No.: US 7,364,132 B2  
(45) Date of Patent: Apr. 29, 2008

(54) SANITARY DIAPHRAGM VALVE

(75) Inventors: Ronnie A. Browne, Streetsboro, OH (US); David C. Kerg, Fairview Park, OH (US)

(73) Assignee: Swagelok Company, Solon, OH (US)

( * ) Notice: Subject to any disclaimer, the term of this patent is extended or adjusted under 35 U.S.C. 154(b) by 681 days.

(21) Appl. No.: 10/109,413

(22) Filed: Mar. 28, 2002

(65) Prior Publication Data

US 2002/0100503 A1 Aug. 1, 2002

Related U.S. Application Data

(63) Continuation of application No. 09/568,425, filed on May 10, 2000, now Pat. No. 6,394,417, which is a continuation-in-part of application No. 09/231,683, filed on Jan. 14, 1999, now Pat. No. 6,123,320.

(60) Provisional application No. 60/103,722, filed on Oct. 9, 1998.

(51) Int. Cl.  
*F16K 29/00* (2006.01)

(52) U.S. Cl. ........................ 251/331; 251/359; 251/366

(58) Field of Classification Search ................ 251/331, 251/366, 359, 335.2; 137/493–493.9  
See application file for complete search history.

(56) References Cited

U.S. PATENT DOCUMENTS 209,867 A 11/1878 Craigie (Continued)

FOREIGN PATENT DOCUMENTS

DE 458931 4/1928

(Continued)

OTHER PUBLICATIONS

Office action dated Aug. 17, 2006 from U.S. Appl. No. 11/294,061.

(Continued)

*Primary Examiner*—Kevin Lee  
(74) *Attorney, Agent, or Firm*—Calfee, Halter & Griswold LLP

(57) ABSTRACT

A sanitary diaphragm valve is provided that includes a generally dome shaped diaphragm having a central boss that can be connected to or driven by a valve actuator. The diaphragm includes an outer peripheral edge and a relatively thin web portion that connects the boss to the outer edge. In one embodiment, the web portion is arcuate or dome shaped. The thinner web portion permits the diaphragm to have an extended cycle life and to permit the valve to operate at higher fluid pressures. The thin web may be defined by two different contoured surfaces, one convex and the other concave, such as formed by two radiuses. A valve body is provided that includes a bowl shaped valve cavity. This valve cavity includes an outer vertical edge to permit more thorough cleaning and to eliminate entrapment areas. The valve assembly provides support surfaces for the diaphragm that reduces stress on the diaphragm particularly at higher operating pressures. A deep bowl embodiment is provided in which the valve cavity is defined by a spherical and preferably a hemispherical surface with the cavity diameter being about the same as the diaphragm diameter. The diaphragm for the deep bowl design has a stem tip that seals one of the valve ports radially outward from the port. The port may include a chamfered valve seat adjacent the port, and the port may be formed by a conical bore.

38 Claims, 18 Drawing Sheets

U.S. PATENT DOCUMENTS

| | | |
|---|---|---|
| 1,383,549 A | 7/1921 | Lang |
| 1,836,976 A | 12/1931 | Krause |
| 1,954,192 A | 4/1934 | Biggs |
| 2,278,002 A | 3/1942 | Thompson |
| 2,348,248 A | 5/1944 | Elliott |
| 2,934,911 A | 2/1946 | Griswold |
| 2,400,099 A | 5/1946 | Brubaker et al. |
| 2,517,484 A | 8/1950 | Henneman |
| 2,631,781 A | 3/1953 | Dillman |
| 2,638,127 A * | 5/1953 | Griswold .................. 251/331 |
| 2,648,351 A | 8/1953 | Curtis et al. |
| 2,683,580 A | 7/1954 | Griswold |
| 2,701,118 A | 2/1955 | Uhler |
| 2,707,481 A | 5/1955 | McPherson |
| 2,729,222 A | 1/1956 | Dickey et al. |
| 2,730,131 A | 1/1956 | Asp et al. |
| 2,736,332 A | 3/1956 | Simmons |
| 2,752,936 A | 7/1956 | Cantalupo |
| 2,811,167 A | 10/1957 | Bott |
| 2,813,945 A | 11/1957 | Courtot |
| 2,849,019 A | 8/1958 | Oliveau et al. |
| 2,865,402 A | 12/1958 | Miller |
| 2,904,068 A | 9/1959 | St. Clair |
| 2,907,346 A | 10/1959 | Fortune |
| 2,971,470 A | 2/1961 | Wein et al. |
| 2,988,322 A | 6/1961 | Anderson |
| 3,011,758 A | 12/1961 | McFarland, Jr. |
| 3,019,815 A | 2/1962 | Lenardon et al. |
| RE25,236 E | 9/1962 | Davies et al. |
| 3,073,341 A | 1/1963 | Schernekau |
| 3,080,887 A | 3/1963 | Brandenberg |
| 3,080,888 A | 3/1963 | Brinkel |
| 3,083,943 A * | 4/1963 | Stewart, Jr. et al. ........ 251/331 |
| 3,104,617 A | 9/1963 | Barr |
| 3,279,749 A | 10/1966 | Fleckenstein et al. |
| 3,282,556 A | 11/1966 | Hancook |
| 3,471,124 A * | 10/1969 | Boteler .................. 251/331 |
| 3,545,722 A | 12/1970 | Bovio |
| 3,587,395 A | 6/1971 | Nisley et al. |
| 3,612,621 A | 10/1971 | Scott |
| 3,717,170 A | 2/1973 | McRae |
| 3,777,777 A | 12/1973 | Katchka |
| 3,838,707 A | 10/1974 | Wachowitz, Jr. |
| 3,884,259 A | 5/1975 | Hilgert |
| 3,884,260 A | 5/1975 | Hilgert |
| 3,905,382 A | 9/1975 | Waterston |
| 3,978,881 A | 9/1976 | Mouranie |
| 4,014,514 A | 3/1977 | Priese et al. |
| 4,029,121 A | 6/1977 | Buzzi |
| 4,029,295 A * | 6/1977 | Wassmer .................. 251/331 |
| 4,072,165 A | 2/1978 | Bradley, Jr. |
| 4,074,697 A | 2/1978 | Saether |
| 4,166,606 A | 9/1979 | Kawolics et al. |
| 4,180,239 A | 12/1979 | Valukis |
| 4,182,372 A | 1/1980 | Grandin, Jr. et al. |
| 4,187,870 A | 2/1980 | Akkerman |
| 4,212,320 A | 7/1980 | Stoll et al. |
| 4,251,053 A * | 2/1981 | Wurzer .................. 251/331 |
| 4,262,697 A | 4/1981 | Davis |
| 4,295,488 A | 10/1981 | Book |
| 4,314,480 A | 2/1982 | Becker |
| 4,337,807 A | 7/1982 | Piet |
| 4,339,111 A | 7/1982 | Welch |
| 4,376,315 A | 3/1983 | Badger et al. |
| 4,394,847 A | 7/1983 | Langenegger et al. |
| 4,408,702 A | 10/1983 | Horvath |
| 4,409,005 A | 10/1983 | McKendrick |
| 4,451,562 A | 5/1984 | Elgas et al. |
| 4,452,276 A | 6/1984 | Hozumi et al. |
| 4,484,562 A | 11/1984 | Burt |
| 4,534,755 A | 8/1985 | Calvert et al. |
| 4,549,719 A | 10/1985 | Baumann |
| 4,561,627 A | 12/1985 | Meckstroth |
| 4,562,864 A | 1/1986 | Yang |
| 4,596,271 A | 6/1986 | Brundage |
| 4,597,719 A | 7/1986 | Tano |
| 4,629,119 A | 12/1986 | Plunkett et al. |
| 4,634,430 A | 1/1987 | Polaschegg |
| 4,671,317 A | 6/1987 | MacKay |
| 4,694,849 A | 9/1987 | Rampen |
| 4,720,076 A | 1/1988 | Hyde |
| 4,720,079 A | 1/1988 | Iizuka et al. |
| 4,754,776 A | 7/1988 | McKee |
| 4,794,951 A | 1/1989 | Ryzner |
| 4,794,952 A | 1/1989 | Burkard |
| 4,836,236 A | 6/1989 | Ladisch |
| 4,848,722 A | 7/1989 | Webster |
| 4,858,883 A | 8/1989 | Webster |
| 4,860,794 A | 8/1989 | Parrott et al. |
| 4,860,990 A | 8/1989 | Fukuzawa et al. |
| 4,898,393 A | 2/1990 | Rollins |
| 4,901,751 A | 2/1990 | Story |
| 4,915,017 A | 4/1990 | Perlov |
| 4,979,527 A | 12/1990 | Mueller et al. |
| 5,002,086 A | 3/1991 | Linder |
| 5,067,516 A | 11/1991 | Gale |
| 5,067,522 A | 11/1991 | Ligh |
| 5,073,149 A | 12/1991 | Maruyama et al. |
| 5,074,196 A | 12/1991 | Michalovic et al. |
| 5,076,320 A | 12/1991 | Robinson |
| 5,108,067 A | 4/1992 | Straub |
| 5,108,069 A | 4/1992 | Tada et al. |
| 5,127,625 A | 7/1992 | Kleinhappl |
| 5,150,883 A | 9/1992 | Cook-Martin |
| 5,151,178 A | 9/1992 | Nickerson et al. |
| 5,172,728 A | 12/1992 | Tsukazaki |
| 5,173,033 A | 12/1992 | Adahan |
| 5,186,434 A | 2/1993 | Nishimura et al. |
| 5,201,492 A | 4/1993 | Beauvir |
| RE34,261 E | 5/1993 | Sule |
| 5,222,523 A | 6/1993 | Trimble |
| 5,261,442 A | 11/1993 | Kingsford et al. |
| 5,265,843 A | 11/1993 | Kleinhappl |
| 5,282,281 A | 2/1994 | Clear et al. |
| 5,288,052 A * | 2/1994 | Black et al. ................. 251/331 |
| 5,295,662 A | 3/1994 | Yamaji et al. |
| 5,326,078 A | 7/1994 | Kimura |
| 5,333,643 A * | 8/1994 | Gilchrist et al. ............ 251/331 |
| 5,335,691 A | 8/1994 | Kolenc |
| 5,335,858 A | 8/1994 | Dunning et al. |
| 5,361,802 A | 11/1994 | Kroll et al. |
| 5,476,004 A | 12/1995 | Kingsford et al. |
| 5,549,134 A * | 8/1996 | Browne et al. ............. 137/606 |
| 5,575,311 A | 11/1996 | Kingsford |
| 5,590,680 A | 1/1997 | Gugala et al. |
| 5,632,465 A * | 5/1997 | Cordua ..................... 251/46 |
| 5,641,271 A | 6/1997 | Forrester et al. |
| 5,660,370 A | 8/1997 | Webster |
| 5,687,766 A | 11/1997 | Weakley |
| 5,695,120 A | 12/1997 | Kingsford |
| 5,730,423 A | 3/1998 | Wu et al. |
| 5,762,086 A | 6/1998 | Ollivier |
| 5,950,675 A | 9/1999 | Minami et al. |
| 5,954,086 A | 9/1999 | Ronchi |
| 5,967,173 A | 10/1999 | Kingsford et al. |
| 5,992,455 A | 11/1999 | Koller et al. |
| 5,996,559 A | 12/1999 | Busato et al. |
| 6,000,416 A | 12/1999 | Kingsford et al. |
| 6,000,430 A | 12/1999 | Nafz |
| 6,007,046 A | 12/1999 | Rothermel |
| 6,043,324 A | 3/2000 | Karbasi |
| 6,056,003 A | 5/2000 | Madsen et al. |
| 6,079,959 A | 6/2000 | Kingsford et al. |
| 6,086,039 A | 7/2000 | Sievers et al. |

| | | | |
|---|---|---|---|
| 6,089,203 | A | 7/2000 | Cantrell et al. |
| 6,123,320 | A | 9/2000 | Rasanow et al. |
| 6,145,810 | A * | 11/2000 | Connolly et al. ............ 251/331 |
| 6,203,071 | B1 | 3/2001 | Kingsford et al. |
| 6,224,728 | B1 | 5/2001 | Oborny et al. |
| 6,241,493 | B1 | 6/2001 | Turner |
| 6,254,057 | B1 * | 7/2001 | Pubben et al. ................. 251/45 |
| 6,328,279 | B1 | 12/2001 | Adkins et al. |
| 6,394,417 | B1 * | 5/2002 | Browne et al. .............. 251/331 |
| 6,416,038 | B1 * | 7/2002 | Sindel et al. ................ 251/331 |
| 6,672,561 | B2 | 1/2004 | Kerg et al. |
| 6,695,917 | B2 | 2/2004 | Wright et al. |
| 6,837,484 | B2 | 1/2005 | Kingsford et al. |
| 6,860,287 | B2 | 3/2005 | Bridges, III et al. |
| 6,883,780 | B2 | 4/2005 | Browne et al. |
| 7,083,157 | B2 | 8/2006 | Kingsford et al. |
| 2004/0007268 | A1 | 1/2004 | Bridges, III et al. |
| 2004/0007686 | A1 | 1/2004 | Kingsford et al. |
| 2006/0008366 | A1 | 1/2006 | Kingsford et al. |
| 2007/0001137 | A1 | 1/2007 | Kingsford et al. |

FOREIGN PATENT DOCUMENTS

| | | |
|---|---|---|
| DE | 2126609 | 12/1972 |
| DE | 3123028 A | 1/1983 |
| EP | 0 063 772 | 11/1982 |
| EP | 0 160 461 | 11/1985 |
| EP | 0 046 513 | 9/1987 |
| EP | 0 312 500 | 4/1989 |
| EP | 0 536 047 A1 | 4/1993 |
| EP | 0 581 287 A1 | 2/1994 |
| EP | 0 853 205 A1 | 7/1998 |
| EP | 0 886 090 A1 | 12/1998 |
| EP | 0 928 917 A1 | 7/1999 |
| IT | 318754 | 1/1934 |
| JP | 552879 | 10/1978 |
| JP | 56-100360 | 8/1981 |
| JP | 60047887 | 3/1985 |
| JP | 360047887 * | 3/1985 ................. 251/331 |
| JP | 1-93674 | 4/1989 |
| JP | 11037329 | 2/1999 |
| JP | 11118049 | 4/1999 |
| WO | WO 95/33191 | 12/1995 |
| WO | WO 96/21816 | 7/1996 |
| WO | WO 97/04878 | 2/1997 |
| WO | WO 98/02659 | 1/1998 |
| WO | WO99/35437 | 7/1999 |
| WO | WO 06/017187 | 2/2006 |
| WO | WO 06/026252 | 3/2006 |
| WO | WO 06/113714 | 10/2006 |

OTHER PUBLICATIONS

International Search Report from PCT/US2004/006294, mailed Jul. 2, 2004.
International Search Report from PCT/US2001/09116, mailed Sep. 25, 2001.
Office action from U.S. Appl. No. 11/294,061, mailed May 5, 2006.
Office action from U.S. Appl. No. 11/294,061, mailed Aug. 17, 2006.
Office action from U.S. Appl. No. 11/294,061, mailed Feb. 8, 2007.
Office action from U.S. Appl. No. 11/294,061, mailed Jun. 19, 2007.
Amicon, Inc. (of Beverly, Massachusetts) Liquid Chromatography Systems' product brochure for K-Prime.TM. 40-AS, Sanitary Laboratory-Preparative Scale Bio-Chromatograph.
Amicon, Inc. (of Beverly, Massachusetts) Liquid Chromatography Systems' product brochure for K-Prime.TM. 400-AS, Sanitary Preparative Scale Bio-Chromatographs.
Dr. J. P. Carvell, "Sterility and Containment Considerations in Valve Selection," Pharmaceutical Engineering, Jan./Feb. 1992; vol. 12, No. 1, pp. 31-35.
Childers, Robert W.; Kojsza, Susan A.; "Hydrogen Peroxide Vapor Sterilization-in-Place Systems", BED-vol. 27, Bioprocess Engineering--1993, ASME 1993.
Christi, Yusuf and Moo-Young, Murray; "Clean-in-Place Systems for Bioreactors: Design, Validation and Operation" vol. 27, Bioprocess Engineering--1993, ASME 1993.
Jordan, John M.; "Integrating CIP Systems Into Process Design", BED-vol. 27, Bioprocess Engineering--1993, ASME 1993.
Linflo Technologies Division of Hypernetics Limited (of Ontario, Canada), product brochure for VP40D Series, Control Valves.
Netzel, James P.; "Seal Technology For Bioprocessing Equipment", BED-vol. 27, Bioprocess Engineering--1993, ASME 1993.
Triflow Controls Corporation (of Tokyo, Japan) product brochure for mu-ZERO.TM. 3-Way Valves.
TE Whiteman, "Flexible Diaphragm Actuates Laminar Flow Valve," Design News, Feb. 23, 1987.
Young, Jack H.; "Parameters Governing Steam-in-Place Sterilization," BED-vol. 27, Bioprocess Engineering--1993, ASME 1993.
Product literature, Saint-Gobain Performance Plastics, Furon HPV Diaphragm Valve, Pneumatically Actuated 2-Way or 3-Way, 2 pgs., 2000.
Product literature, Saint-Gobain Performance Plastics, Furon HPVM Diaphragm Valve, Pneumatically Actuated 2-Way (3/16" & 1/4" orifice), 2 pgs., 2004.
Product literature, Saint-Gobain Performance Plastics, Furon RDVM-1000 (Molded) 1" Rolling Diaphragm Valve, Pneumatic or Manual Actuated 2-Way Valve, 2 pgs., 2001.
Product literature, Saint-Gobain Performance Plastics, Furon HPV Diaphragm Valve, Pneumatically Actuated 3-Way (1/4" orifice), 2 pgs., 2004.
Product literature, Saint-Gobain Performance Plastics, Furon Chempure 2" In-Line Valve, Pneumatically Actuated 2-Way Valve, 2 pgs., 2001.
Product literature, Saint-Gobain Performance Plastics, Furon InLine-1000 (Molded) 1" High Flow Valve, Pneumatic or Manual Actuated 2-Way Valve, 2 pgs., 2001.
Product literature, Saint-Gobain Performance Plastics, Furon CDV-1000 Compact Diaphragm Valve, Pneumatically Actuated 2-Way (1/2" Orifice), 2 pgs., 2001.
Product literature, Saint-Gobain Performance Plastics, DI Bandit Valve, Pneumatically Actuated 2-Way (1/2" orifice), 2 pgs., 1996.
Product literature, Saint-Gobain Performance Plastics, Furon NVX Valves, Pneumatic Actuated, 2-Way & 3-Way, 2 pgs., 2007.
Product literature, Saint-Gobain Performance Plastics, Furon HPV Diaphragm Valve, Manually Actuated 2-Way, Mult-turn (3/16" & 1/4" orifice), 2 pgs., 2004.
Office action from U.S. Appl. No. 11/294,061, mailed Dec. 13, 2007.

* cited by examiner

_US 7,364,132 B2_

SANITARY DIAPHRAGM VALVE

RELATED APPLICATIONS

This application is a continuation of U.S. patent application Ser. No. 09/568,425 filed on May 10, 2000, U.S. Pat. No. 6,394,417 for SANITARY DIAPHRAGM VALVE the entire disclosure of which is fully incorporated herein by reference.

TECHNICAL FIELD OF THE INVENTION

The present invention relates to radial diaphragm valves. More particularly, the invention is directed to a sanitary diaphragm valve that includes a dome shaped diaphragm and a bowl shaped valve cavity with various other features that provide a diaphragm valve that is easier to clean, has an extended cycle life, higher flow rates and that can operate at higher pressures.

BACKGROUND OF THE INVENTION

Various fields such as, for example, biotechnology, semiconductor, pharmaceutical, food processing, and medical, require fluid handling systems that are clean and sterile while at the same time having increased cycle life and operating pressure. A very important consideration is ease with which the fluid handling components can be cleaned. The ease with which a system can be cleaned depends on, among other things, minimal dead volumes and entrapment areas. The fluid handling system must also use components that are inert to the fluid. Such systems often use valves as flow control devices, and diaphragm valves in particular are often used.

U.S. Pat. No. 5,549,134 (the "'134 patent" hereinafter), the entire disclosure of which is fully incorporated herein by reference, describes a diaphragm valve design that is particularly well suited for these various sanitary applications. The present invention is directed to various improvements and additional features in the design of the '134 patent valve to enhance its cleanability and operating performance including, among other things, its operating pressure characteristic and cycle life. Still further the present invention is directed to increasing the flow rate.

SUMMARY OF THE INVENTION

To the accomplishment of the foregoing objectives, and in accordance with one embodiment of the invention, a sanitary diaphragm valve is provided that includes a dome shaped diaphragm having a central boss that can be connected to or driven by a valve actuator, an outer peripheral region, and a relatively thin web portion that connects the boss to the outer peripheral region. In one embodiment, the web portion is arcuate or dome shaped. The thinner web portion permits the diaphragm to have an extended cycle life and to enable the valve to operate at higher fluid pressures. In accordance with another aspect of the invention, the thin web may be defined by multiple curved surfaces. In one embodiment, the multiple curved surfaces are realized in the form of two surfaces with different radiuses of curvature.

In accordance with a further aspect of the invention, a valve body is provided that includes a bowl shaped valve cavity. This valve cavity includes an outer contour to permit more thorough cleaning and to eliminate entrapment areas. In a preferred embodiment, the valve cavity outer contour is realized in the form of a substantially vertical edge joined to the cavity by a smooth transition such as a radius, for example.

In a further embodiment of the invention, the actuator housing provides support surfaces for the diaphragm that reduces stress on the diaphragm particularly at higher operating pressures.

In accordance with another aspect of the invention, a deep bowl cavity design is used with a diaphragm that seals radially outside one of the valve ports. This concept greatly improves flow rates and also permits the port to open to the valve cavity off-axis to eliminate a right angle elbow inlet. Still a further aspect of the invention is a diaphragm stem that is undercut to provide a surface area that in response to back pressure urges the valve diaphragm to a closed position. This feature also may be used to realize a check valve.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1A:
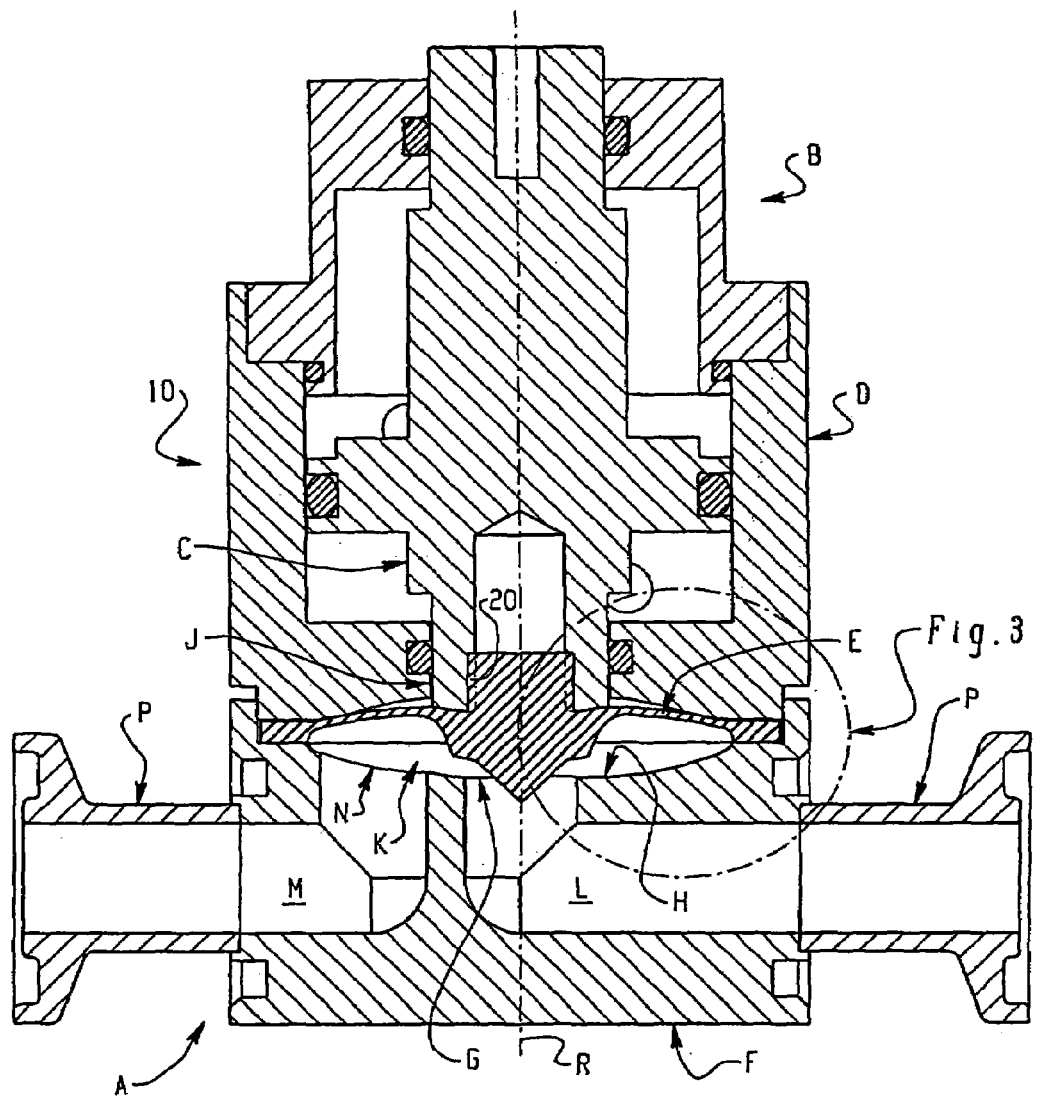
FIGS. 1A and 1B illustrate a diaphragm valve in elevation and vertical cross section that includes a number of the features of the present invention (the valve being in an open position in FIG. 1A and a closed position in FIG. 1B)

With reference to FIG. 1A, an embodiment of a diaphragm valve and actuator assembly 10 in accordance with the present invention is illustrated in cross-sectional elevation. The assembly 10 includes a valve A and a valve actuator B. The actuator B includes a valve actuator stem C that axially moves within an actuator housing D to operate a diaphragm E in a valve body F. The valve body F and actuator housing D are mounted together and form the assembled valve A. The diaphragm E closes a port G by being pressed into engagement with a valve seat area H (see FIG. 1B). The general construction and operation of the valve assembly 10 is described in the above-referenced patent '134 and will not be repeated herein. However, the actuator housing D, the diaphragm E and the valve body F have a number of modifications as compared to the corresponding structures in the '134 patent and will be described in detail herein. However, it should be noted that a diaphragm in accordance with the present invention can be and is intended to be for many applications used in place of and as a replacement for the diaphragm of the '134 patent without other modifications to the '134 patent valve.

Although a number of alternative embodiments or examples are presented herein, such examples are not intended to be and should not be construed as being an exhaustive list. Many different electrical, mechanical and materials variations to the described embodiments will be readily apparent to those skilled in the art, whether explicitly stated herein or not, and such variations may be made without departing from the teachings and scope of the invention. Furthermore, the invention includes a number of different aspects, each of which may be used separately or in combination with any one or more of the other aspects of the invention.

The actuator B in this embodiment is an air operated actuator, however, a valve in accordance with the present invention can be actuated in any manner convenient to the designer, including electromechanical actuation, hydraulic, pneumatic, manual and so forth. Therefore, the operational details of the actuator B are not essential to the present invention, except that in accordance with one aspect of the invention, the actuator stem C includes a diaphragm support structure as will be described herein below in greater detail. For purposes of the present description, it is sufficient to understand that the actuator stem C moves axially (vertically in the view of FIG. 1A) so as to move the diaphragm E into and out of engagement with the valve seat H. The actuator stem C includes a tip J that supports the diaphragm as described below.

The basic valve assembly 10 further includes the valve body F having a valve chamber or cavity K formed therein as described in the '134 patent. The diaphragm E is used to seal this cavity K. An inlet fluid passage L opens to the valve cavity K at the inlet port G. An outlet fluid passage M opens to the valve cavity K at an outlet port N. Suitable fittings P can be used to provide fluid tight connections of the valve to upstream and downstream fluid conduits or other flow control devices (not shown).

Figure 2A:
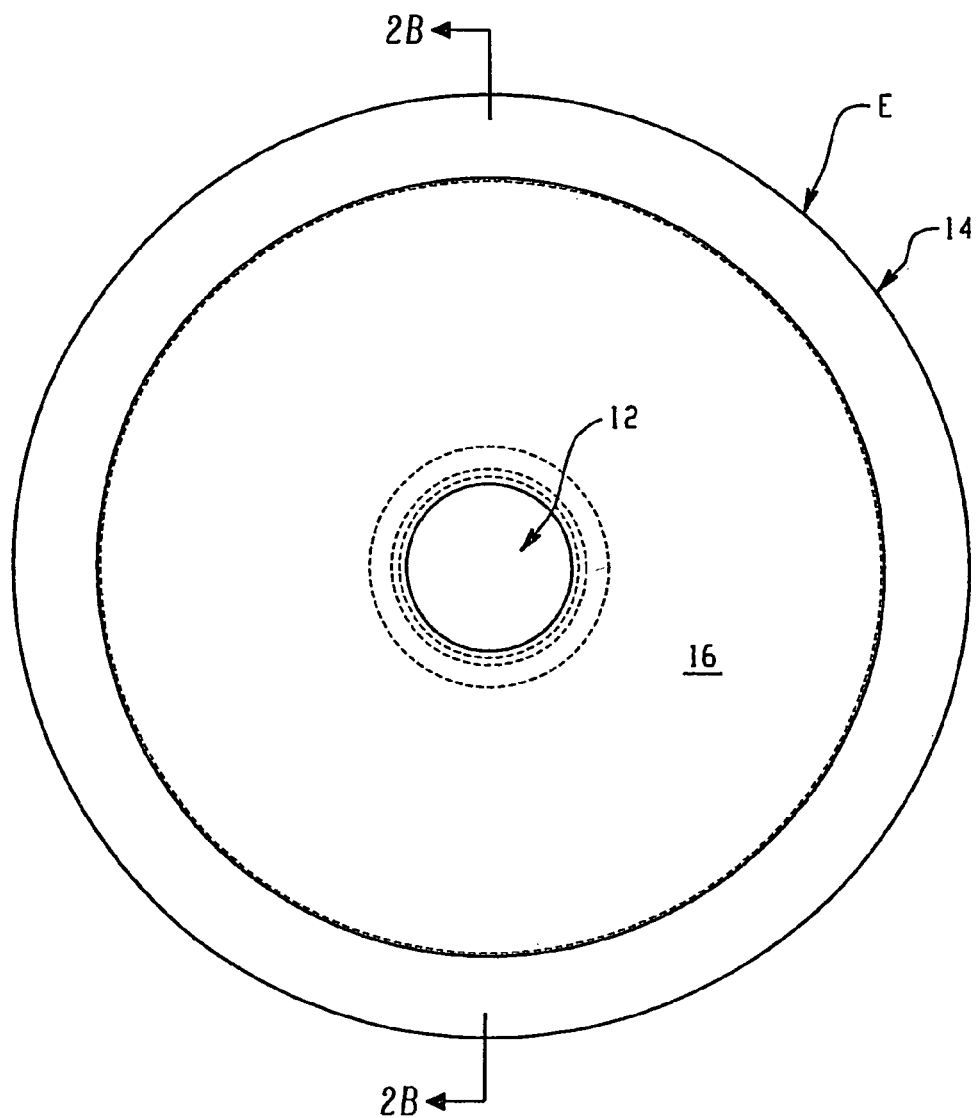
FIGS. 2A and 2B are a top view and a detailed illustration in cross-section along the line 2B—2B in FIG. 2A respectively of a diaphragm in accordance with the invention and as used in the valve of FIG. 1.
Figure 2B:
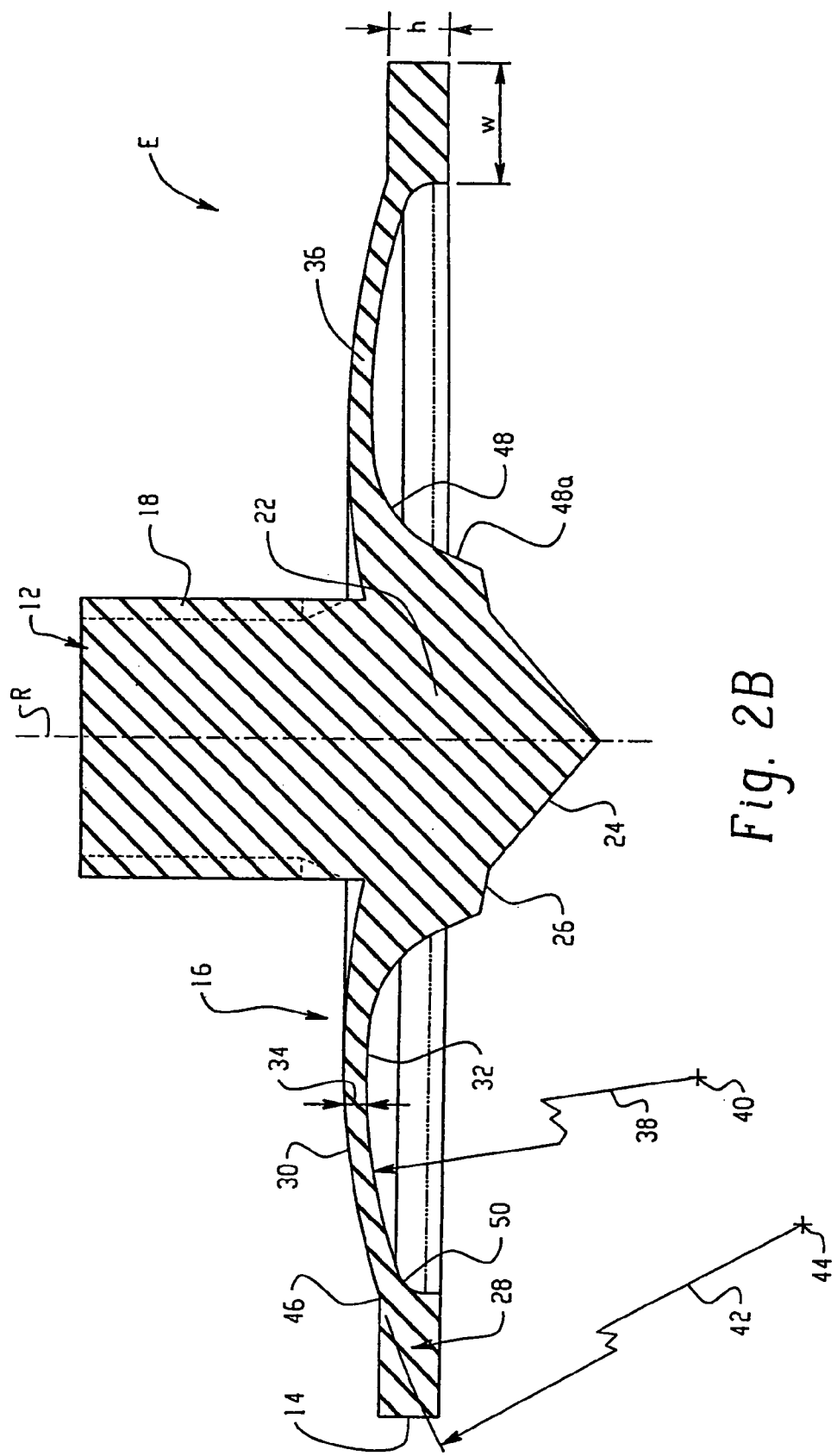

With reference to FIGS. 2A and 2B, an embodiment of the diaphragm E in accordance with the invention is illustrated in detail. As compared generally to the diaphragm of the '134 patent, the diaphragm E of the present invention is somewhat disk shaped and includes a central actuator boss 12 and an outer peripheral region or edge 14 that is joined to the boss 12 by a web portion 16. In contrast, however, the diaphragm E has a generally dome shaped or half-toroid web portion 16 so that the diaphragm E is substantially non-planar. The diaphragm E is preferably symmetrical about a central axis R, which axis coincides with the longitudinal axis of the actuator stem C (FIG. 1A).

With reference to FIG. 2B, the diaphragm central boss 12 is externally threaded as at 18. This permits the diaphragm E to be threadably joined to the actuator tip J. The tip J has corresponding internal threads 20 (see FIG. 1A). Other techniques for joining the diaphragm to the actuator tip J may alternatively be used.

The central boss 12 extends from a central diaphragm body portion 22. A conical tip 24 is formed at an end of the central diaphragm body 22 that is opposite the boss 12. The conical tip 24 is circumscribed by an annular seal surface 26. The conical tip 24 improves the flow rate of fluid through the valve. Other geometric profiles of the tip 24 may be used. For example, a frusto-conical tip may be used, as may a cone shape with a rounded or radius tip. The particular profile selected will depend on the valve design and flow characteristics desired.

The peripheral edge 14 is provided in this exemplary embodiment by a circumferential rim 28. The rim 28 is joined to the central body 22 by the continuous dome shaped web 16. As illustrated in FIG. 2B, the web 16 is a relatively thin member having a convex outer surface 30 that faces away from the valve cavity K when the diaphragm is installed in a valve body as in FIG. 1A. The web 16 also has a concave inner surface 32 that faces the valve cavity K when the diaphragm is installed in a valve body as in FIG. 1A. By "relatively thin" is meant that the web 16 is substantially thinner than the rim 28 and the central body 22 of the diaphragm E. This thin web 16 thus significantly increases the flexibility of the diaphragm E.

In accordance with one aspect of the invention, the web 16 has a non-uniform thickness 34 along its radial extent between the central body 22 and the rim 28. Alternatively, the web may have a substantially uniform thickness between the central body 22 and the rim 28. The web 16 is preferably but not necessarily thinnest in its central region 36 and gradually thickens to the areas where the web 16 joins the central portion 22 and the rim 28. By this structure, the web 16 is very flexible but avoids stress concentrations that could tend to weaken over many operating cycles.

The varying thickness of the web 16 is achieved in the embodiment of FIG. 2B by forming the outer surface 30 along a radius 42 that is centered at a first origin 44, for example, and forming the inner surface 32 along a second radius 38 that is centered at a second origin 40, for example. In the embodiment of FIG. 2B, the origins 40 and 44 are located at different spatial positions, and the first radius 38 is shorter than the second radius 42. However, these are merely examples, and for a particular diaphragm the origins 40, 44 could be the same point. In such an alternative design, having the same origin point would produce outer and inner surfaces 30, 32 that are concentric in the central portion of the web 16. Those skilled in the art will appreciate that the dome shape of the web 16 can be realized in other ways besides forming the surfaces 30, 32 along radius contours. The dome shape can be realized in any manner using arcuate-like or other contours or geometric configurations that produce a convex outer surface and a concave inner surface.

The upper surface 30 of the web 16 is joined to the rim 28 by a radius 46 or other smoothly blended transition. The inner concave surface 32 is joined to the central body 22 by a radius transition 48 or other smoothly blended transition. The inner surface 32 is also joined to the rim 28 by a radius 50 or other smooth transition or blend. In this embodiment it will be noted that the radius 48 forms or transitions from a surface 48a that extends radially outward from the central body towards the rim 28.

Figure 1B:
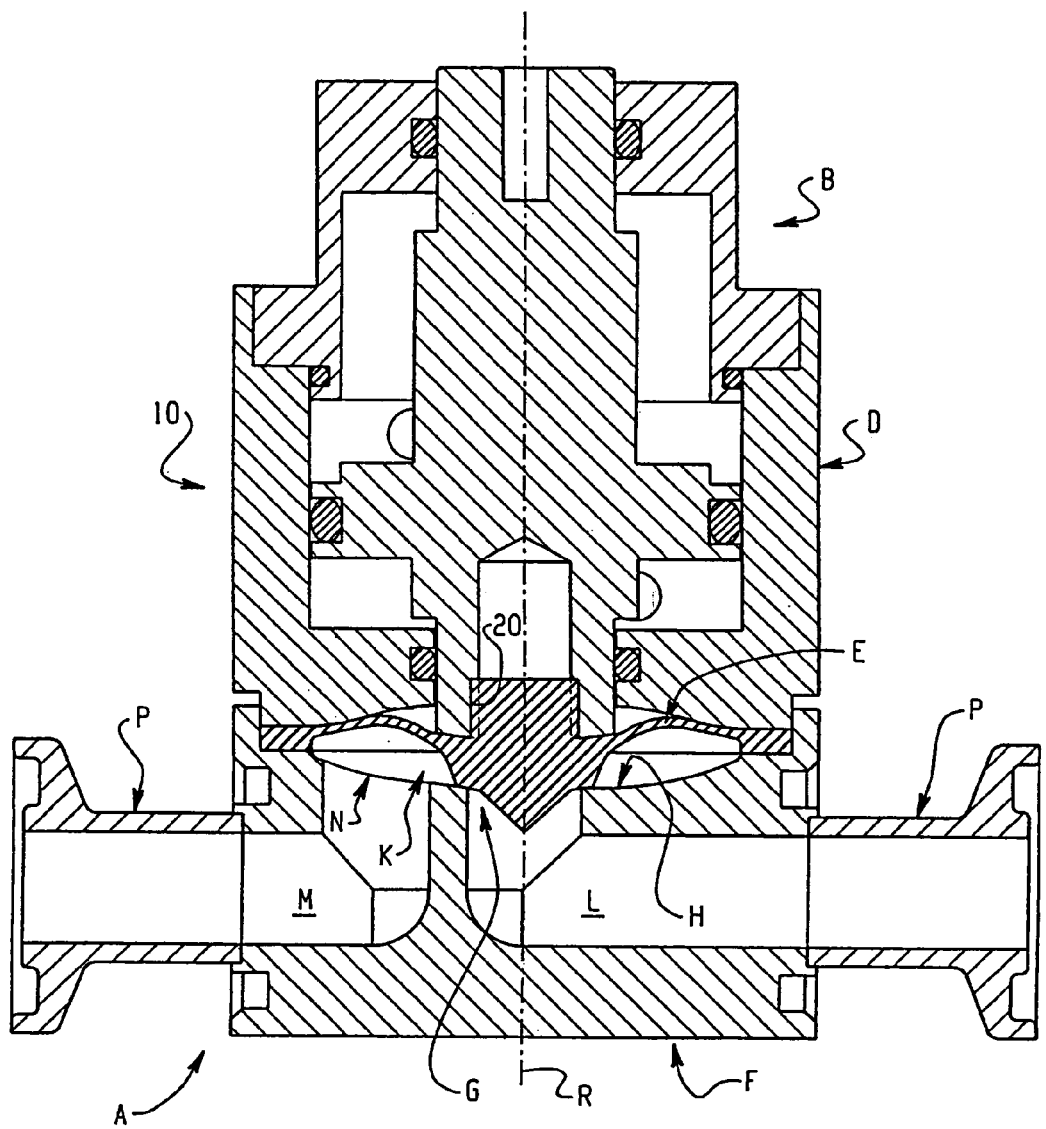

An advantage of the dome shaped diaphragm design is that the web 16 is not subjected to high tensile stress in the radial direction when the diaphragm is flexed to the closed position as illustrated in FIG. 1B. The increased flexibility of the diaphragm E also reduces the actuator force required to close the valve. This has the additional benefit of increasing the shut-off pressure rating of the valve.

In accordance with another aspect of the invention, the rim 28 is designed to have a width "w" to height "h" ratio of about two to one. This exemplary ratio helps assure that the rim 28 is not too thick because some materials will tend to cold flow, particularly polytetrafluoroethylene (PTFE). However, in applications where cold flow is not a significant concern or for different size diaphragms or where other materials are used for the diaphragm, the rim 28 can be formed with different ratios.

The diaphragm E may be made of any suitable material that is compatible with the fluid passing through the valve. Examples include PTFE and TFM, the latter being a modified version of PTFE. However, the diaphragm E can be made from any flexible material including but not limited to elastomers such as EPDM, Buna™, Viton™ and so forth and polymers such as, for example, HOSTAFLON® TF™, HOSTAFLON® TFM™, Teflon NXT™, to name a few examples.

Figure 3:
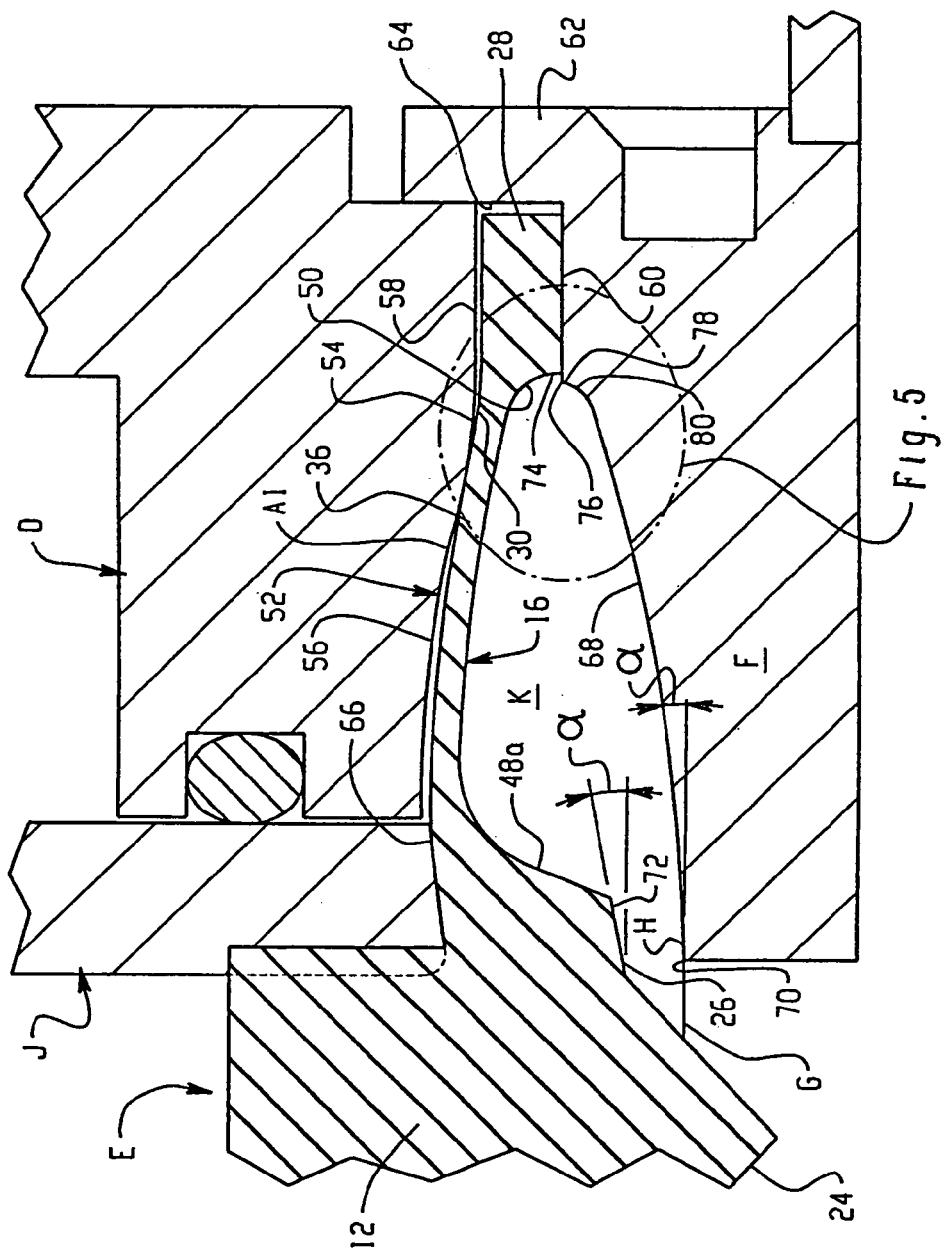
FIG. 3 is an enlarged view in cross-section of the dotted region of FIG. 1A before the diaphragm is fully clamped into the valve body.
Figure 4:
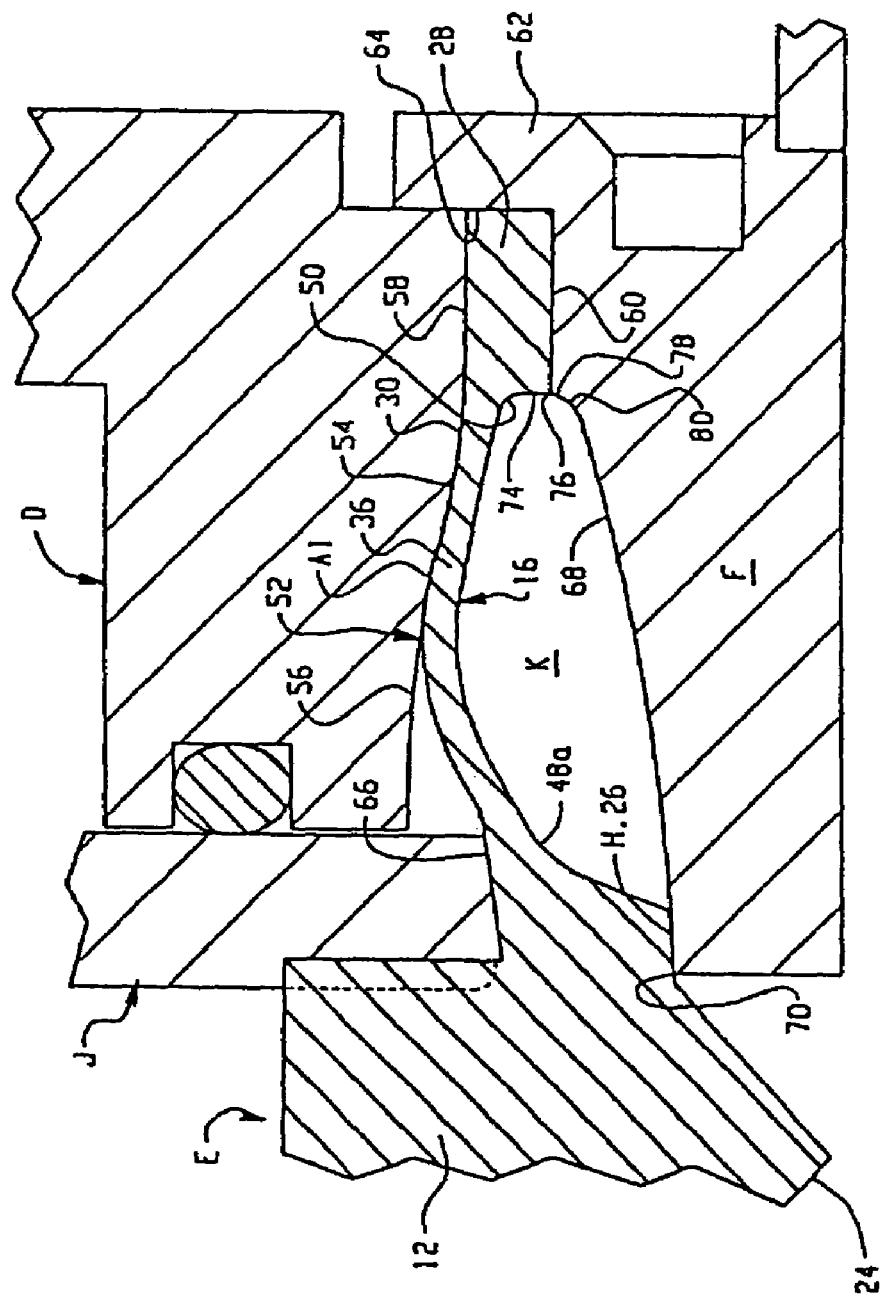
FIG. 4 is similar to FIG. 3 with the diaphragm fully clamped in the valve body with the diaphragm in a closed position and under pressure.

With reference to FIGS. 3 and 4, additional features of the invention are illustrated. FIG. 3 is an enlarged view of the dotted area in FIG. 1A to show various aspects of a diaphragm support structure. FIG. 3 shows the diaphragm E before it is fully clamped in the valve assembly, and FIG. 4 shows the same area after the diaphragm is fully installed and under pressure.

As noted herein before, a significant advantage of the diaphragm E is the use of the thin web 16. The thin web 16 substantially increases the flexibility of the of the diaphragm E. This increased flexibility allows the actuator C (FIG. 1B) to move the diaphragm to a closed position against higher fluid pressures with similar closing force. However, the thinner flexible web 16 will also tend to bow out or balloon under a number of different circumstances including when the valve is open with a higher inlet fluid pressures, or when the valve is being closed against higher fluid pressures, or when the valve is closed and there is substantial back pressure from the outlet fluid passage M (FIG. 1B). Therefore, in accordance with another aspect of the invention, a support structure is provided for the diaphragm E to permit a thin web 16 to be used. Different techniques can be used to support the diaphragm in accordance with the invention, a few examples of which will now be described.

In FIG. 3, the actuator housing D is formed with a diaphragm support surface 52. In this embodiment, the support surface 52 includes a radially outward convex portion 54 that transitions as at A1 to a radially inward concave portion 56.

The actuator housing D also includes a peripheral flat clamping portion 58 that cooperates with an opposed peripheral flat or near flat clamping portion 60 of the valve body F. The rim 28 is sandwiched and compressed between the actuator housing flat 58 and the valve body flat 60 to thus clamp the diaphragm E in the valve assembly. As shown in FIG. 4, when the actuator housing D and the valve body F are tightened together, the rim 28 is compressed and radially expands due to the resilient nature of the diaphragm E material. An axial extension 62 of the valve body provides a radially adjacent wall 64 that engages the compressed rim 28, thus preventing cold flow of the rim 28 in a radially outward direction.

In some valve designs, the actuator housing D will not always be adjacent the diaphragm upper surface 30, but rather some other structural member of the valve or actuator (such as a bonnet for example) will serve the purpose of clamping the diaphragm into the assembly 10. In such cases, this structural member can be modified to include an extension or other portion that overlays and supports the diaphragm E outer surface.

The convex diaphragm support portion 54 initially engages and supports the diaphragm outer surface 30, particularly when the valve is open (as viewed in FIG. 3). If there is significant inlet fluid pressure from the inlet port G, the diaphragm will tend to bow upward. However, the upper surface 30 of the diaphragm will then be in contact with or engage the concave portion 56 to prevent excessive bowing. The radially inward portion 56 is concave to more closely conform to the shape of the domed diaphragm, particularly when the diaphragm is bowed due to high pressure. The concave contour 56 can thus support a significant portion of the radially inward outer surface area of the diaphragm E. However, those skilled in the art will appreciate that the concave portion could also be planar or convex as required for a particular application, as could the convex portion 54. Furthermore, in the preferred embodiment of FIG. 3 the support surface extends from the rim 28 area to about the actuator stem J. However, some valve housing designs may not allow for this much support surface structure. The design effort should be directed to maximizing the area of support for the outer diaphragm surface 30, particularly in its thinnest region 36 and near the central boss 12.

Thus, the contour of the support surface 52 illustrated in the drawings is intended to be exemplary in nature. This contour should be designed to support as much of the outer surface 30 area of the diaphragm as possible, especially when the diaphragm is under high internal pressure force.

The actuator tip J can also be used to provide a diaphragm support surface. As illustrated in FIG. 3, the tip J includes an angled lower surface or radius or other suitable contour 66 that extends radially outward to engage and support a radially inner portion of the diaphragm E near the boss 12.

As indicated on FIG. 3, the annular seal surface 26 is formed at an angle $\alpha$ from flat. The valve chamber K is defined in part by the curvilinear bowl-shaped contour 68 of the valve body F. An annular valve seat area H adjacent the inlet port G is formed flat or at an angle that is preferably less than the angle $\alpha$ of the seal surface 26. The seal surface 26 is appropriately dimensioned in the radial direction so that an annular seal seat edge 70 contacts the seal surface 26 approximately in a central area 72 thereof. The angle $\alpha$ assures that the surface 26 initially contacts the valve seat 70 with a line seal. This assures a high contact pressure between the seal surface 26 and the seat 70 even with the higher flexibility of the diaphragm E. The angle $\alpha$ can be, for example, about eleven degrees.

As noted herein before, the valve body F is formed with the bowl shaped contour 68 to define part of the valve chamber K. As illustrated in FIGS. 3 and 4, the diaphragm rim 28 is dimensioned with a width "w" (FIG. 8) such that in a clamped state (FIG. 4) an inner radial edge 74 of the rim is spaced radially inward or aligned flush with an edge 76 of the valve contour 68. When the rim 28 is compressed between the housing flat 58 and the body flat 60, as shown in FIG. 4, the rim 28 is squeezed such that its inner edge 74 either aligns flush with the contour edge 76, or slightly overlaps the contour edge 76. This significantly improves the cleanability of the valve. The rim 28 should be dimensioned so that when it is compressed it will not be positioned radially outward of the cavity edge 76 because such a condition would present an entrapment area.

In addition to forming a flush or slightly overlapped alignment between the edge 76 and the inner edge 74 of the diaphragm rim 28, the rim 28 is joined to the diaphragm web portion 36 by a radius or other smooth transition 50 that terminates at a surface 74 that is preferably, but not necessarily, substantially parallel to the longitudinal axis R of the diaphragm. Similarly, the valve cavity edge 76 is preferably formed by a radius or other smooth transition 80 that terminates at one end at a surface 78 that is preferably, but not necessarily, substantially parallel to the longitudinal axis R of the diaphragm and/or the flow axis through the outlet port N. The transition 80 at an opposite end transitions into the bowl shaped contour curvilinear surface 68 that defines part of the valve chamber. This arrangement significantly improves the cleanability of the valve.

Figure 5:
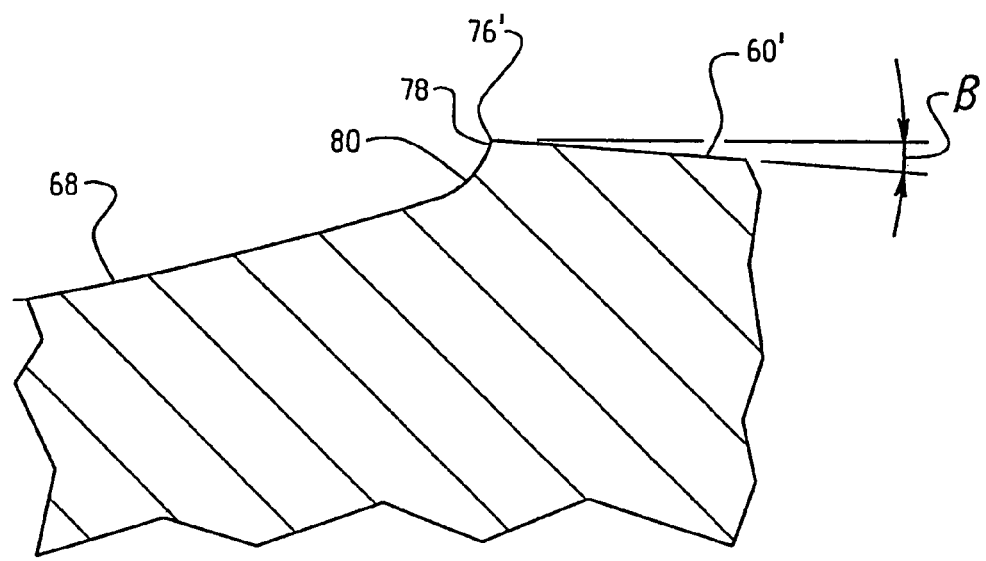
FIG. 5 is an enlarged view of an alternative embodiment of a diaphragm clamping surface.

With reference to FIG. 5, an alternative design for the rim 28 clamping area is illustrated. FIG. 5 shows an enlarged detail of the encircled area in FIG. 3, in particular the valve body clamping surface 60. In this embodiment, the clamping surface 60' is declined at an angle β from flat. In the exemplary embodiment the angle β is about 3°, however, other values for β can be used as required for a particular application. This assures that when the diaphragm rim 28 is clamped between the surface 60' and the opposite clamping surface 58, a sharp edge 76' will contact the rim 28. This sharp edge contact has been found to improve, in many cases, the cleanability of the valve.

Figure 6:
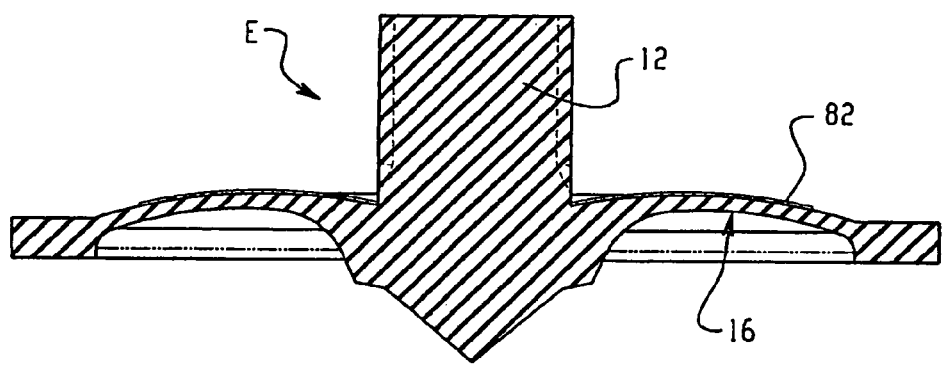
FIG. 6 illustrates another aspect of the invention to provide support to the diaphragm web.

FIG. 6 illustrates another aspect of the invention. As noted herein above, some valve designs may prevent the designer from being able to incorporate a support surface 52 (FIG. 3) for the diaphragm web 16. Or possibly the valve body and actuator body structures prevent the design of a support structure 52 that sufficiently covers a large portion of the web 16, particularly the radial inner portion of the web 16. In such cases, and even for valves in which the support structure 52 can be used, backup rings or disks 82 can be laid on top of the diaphragm web 16 to support the web. The rings may be a single ring or a set of stacked rings that are formed of a suitable stiff material such as metal. These rings 82 can simply be laid on top of the diaphragm E. As shown in FIG. 6, the rings 82 may be contoured to conform to the unstressed contour of the domed web 16, more specifically the curvature of the outer convex surface 30. In the embodiment of FIG. 6, the rings 82 extend to the boss 12 and thus will be securely held by the actuator tip J. Other available options include but are not limited to having the rings 82 loosely overlay the outer convex surface 30 without extending all the way to the boss 12, or the rings could be sandwiched and held at their perimeter by the actuator housing D or otherwise secured to the outer surface of the diaphragm.

Figure 7A:
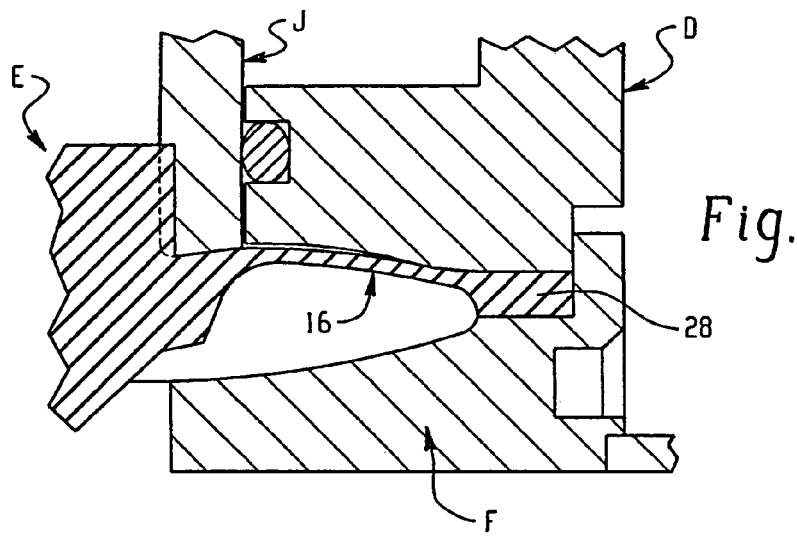
FIGS. 7A–7C illustrate operation of the flexible diaphragm under different operating conditions based on finite element analysis.
Figure 7B:
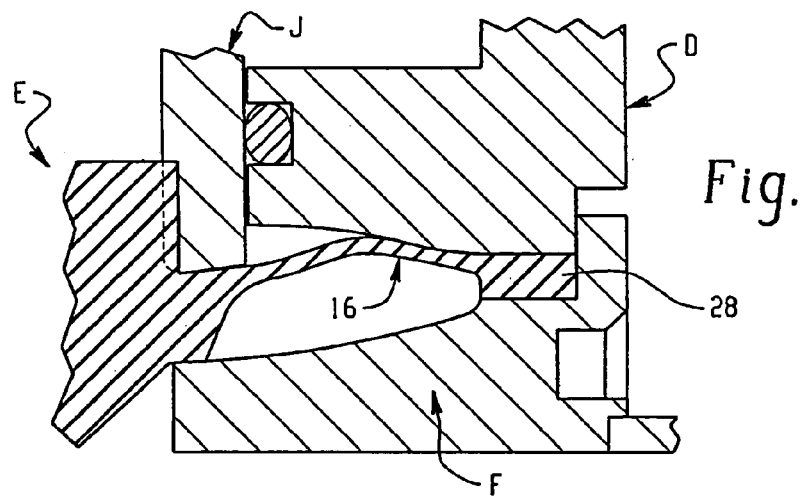
Figure 7C:
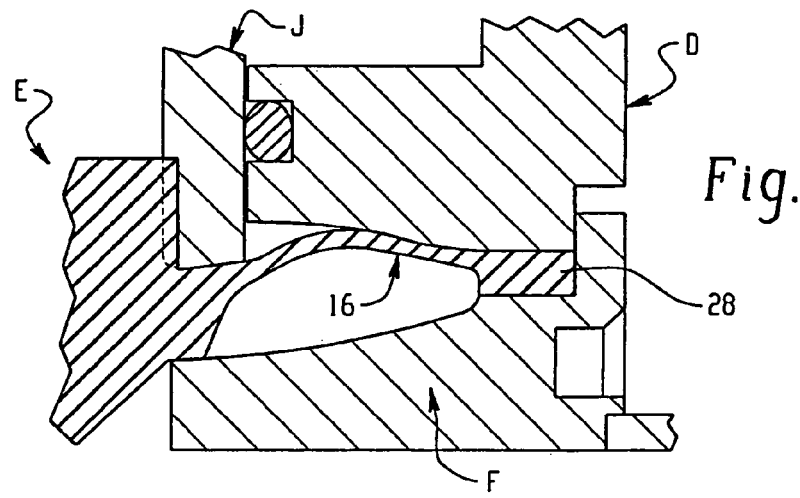

FIGS. 7A–7C illustrate operation of the flexible diaphragm E. These figures are based on finite element analysis of the diaphragm during simulated operating conditions. Therefore, the only structures shown are portions of the diaphragm E, the actuator tip J, and the actuator body D. In FIG. 7A the diaphragm E is in a fully open position with an inlet fluid pressure of about 65 psi. Note that the diaphragm web 16 is substantially supported by the support structure 52 of the actuator body and the contoured surface 66 of the actuator tip J. In FIG. 7B the diaphragm E is shown in a fully closed position with an internal pressure of about 65 psi. First, it is noted that the diaphragm web 16 balloons substantially but much of the web is supported against the contoured surface of the support surface 52. FIG. 7C illustrates the diaphragm in a fully closed position but at an internal pressure of about 120 psi. Even though the higher pressure further balloons the web 16, this pushes more of the web into supporting contact with the support structure 52. Thus, the thin web diaphragm E performs well even at higher operating pressures. The thinner more flexible web further facilitates the diaphragm 16 to be closed against these higher pressures.

Figure 8:
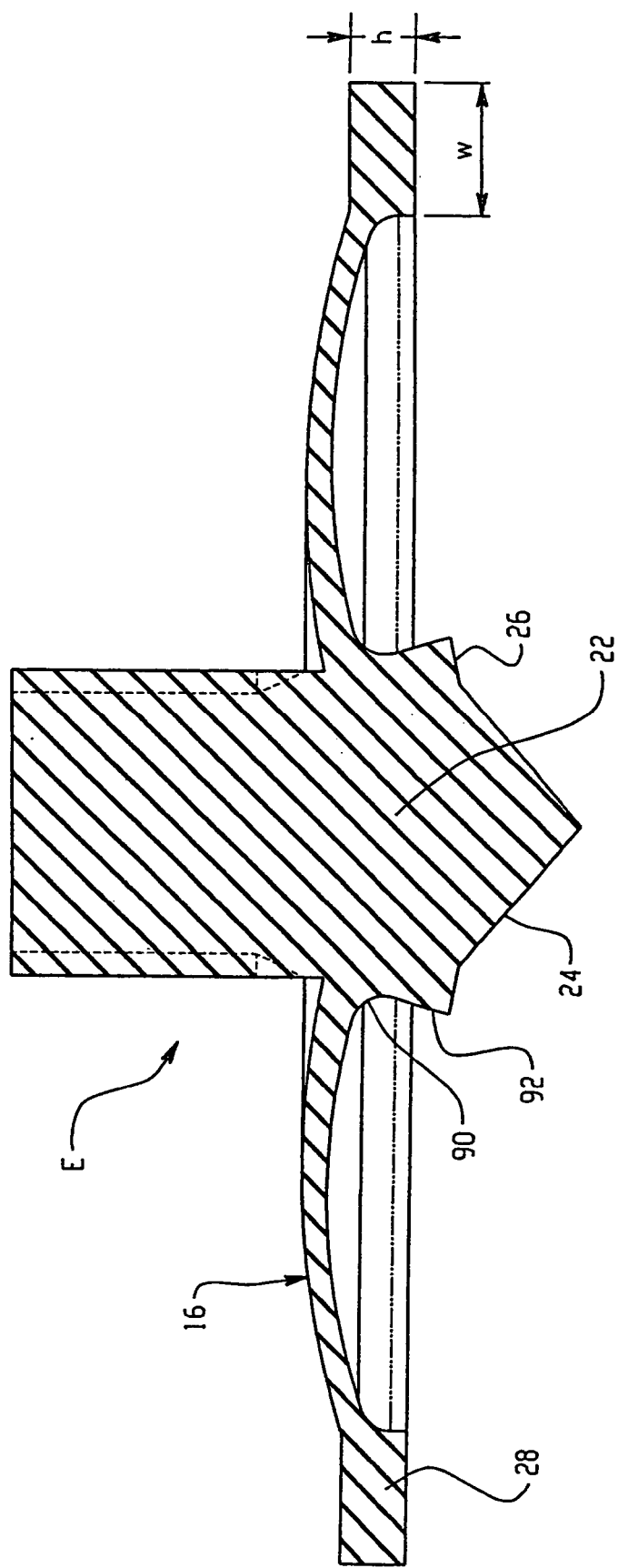
FIG. 8 illustrates an alternative embodiment of the diaphragm in accordance with another aspect of the invention.

FIG. 8 illustrates an alternative design for the diaphragm E. All features of the diaphragm E are the same as the embodiment of FIG. 2B except as to the transition region between the web 16 and the central body 22. The thin web 16 greatly increases the flexibility of the diaphragm E. However, in some applications even greater flexibility may be desired. In such cases, the web 16 concave surface 32 is joined to the central body 22 by a radius 90 or other smooth transition. However, in this case, the transition 90 forms or transitions to a surface 92 that extends radial inwardly towards the central body 22, thus forming an undercut in the central body 22. This configuration thus provides a substantially thinner joint or transition between the web 16 and the central body 22, as compared to the embodiment of FIG. 2B, thus increasing the flexibility of the diaphragm. The tradeoff is that the undercut presents a potential entrapment area, or region that may be difficult to clean in some applications.

Figure 9A:
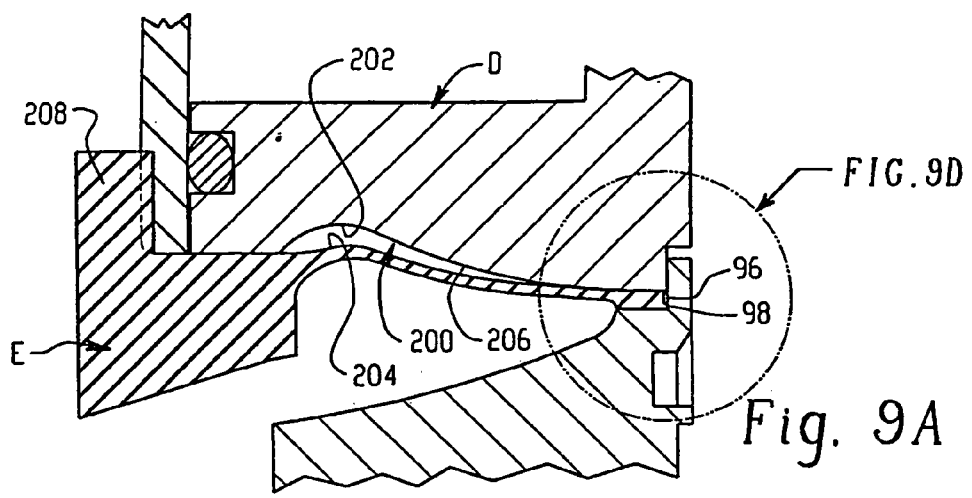
FIGS. 9A–9D illustrates a further embodiment of the diaphragm.
Figure 9B:
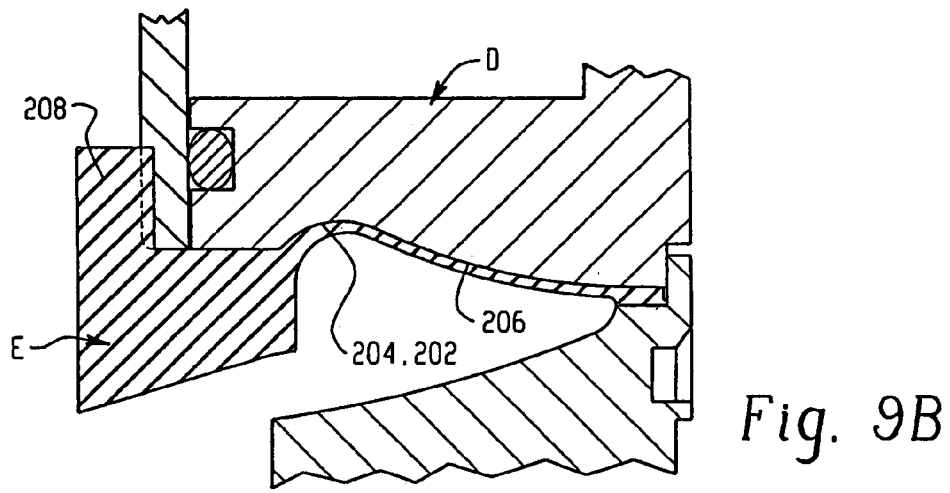
Figure 9C:
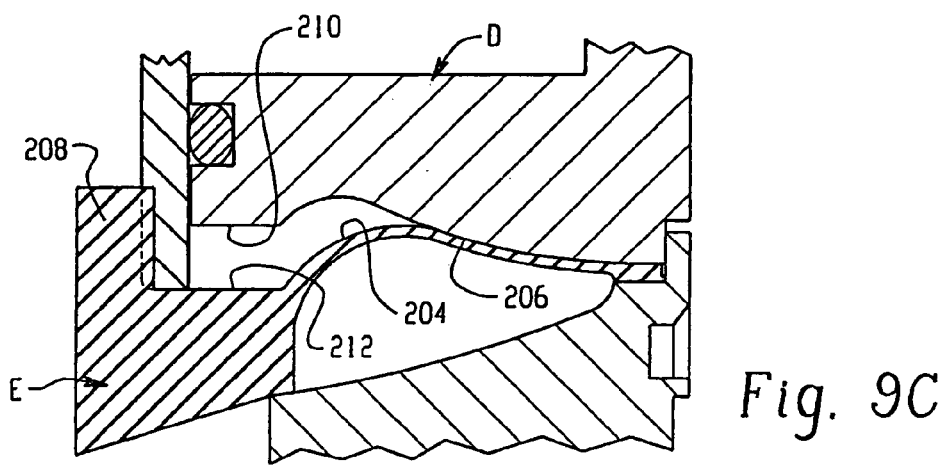

FIGS. 9A–9D illustrates further embodiments of the diaphragm. In FIGS. 9A–9C, the diaphragm E is illustrated in an open position without pressure in the valve, open position with the valve under pressure, and in a closed position, respectively. In this embodiment, the support surface 200, which is formed in the actuator housing in this embodiment, includes an annular recess 202. The annular recess 202 is configured to receive and support the diaphragm upper surface 204, which can bow or balloon significantly when the valve is under pressure and the diaphragm is in the open position. The shape of the recess 202 will be selected to best conform to the diaphragm for providing adequate support. The support surface 200 further includes the transition to a convex portion 206 as in the other embodiments described herein.

The valve illustrated in FIGS. 9A–9C is a larger valve than that illustrated in the other drawings herein. Thus, the diaphragm E includes a larger diameter central boss 208. The support surface 200 is therefore provided with a corresponding flat 210 that may engage the boss 208 upper surface 212 when the diaphragm is in the open position as in FIGS. 9A and 9B for example. The diameter of these planar regions 210, 212 will vary with the size of the diaphragm and valve. FIGS. 10A–10E illustrate various examples of different size diaphragms (FIG. 10A being a larger valve to FIG. 10E being a smaller valve) and the corresponding changes in configuration of the support surface, however, all the diaphragms share the basic features of the invention as described herein above.

Figure 9D:
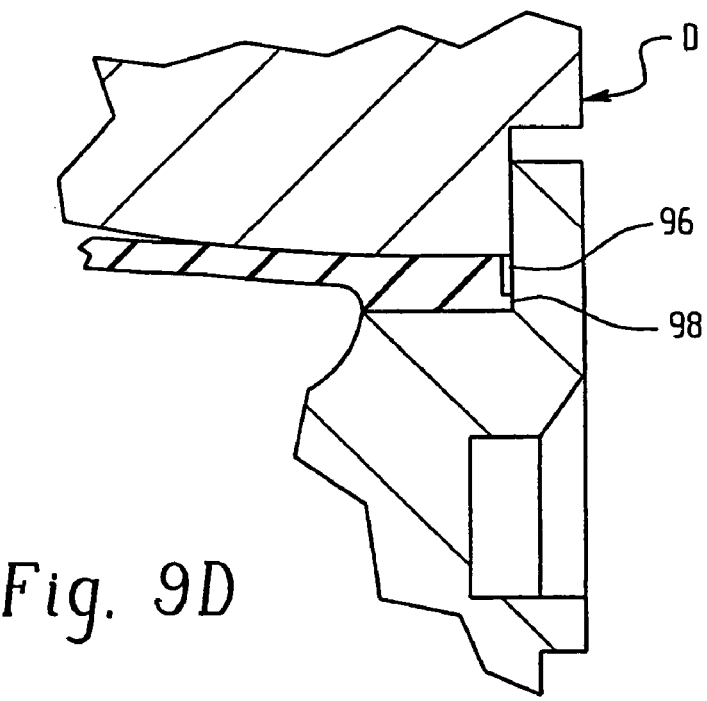
Figure 10A:
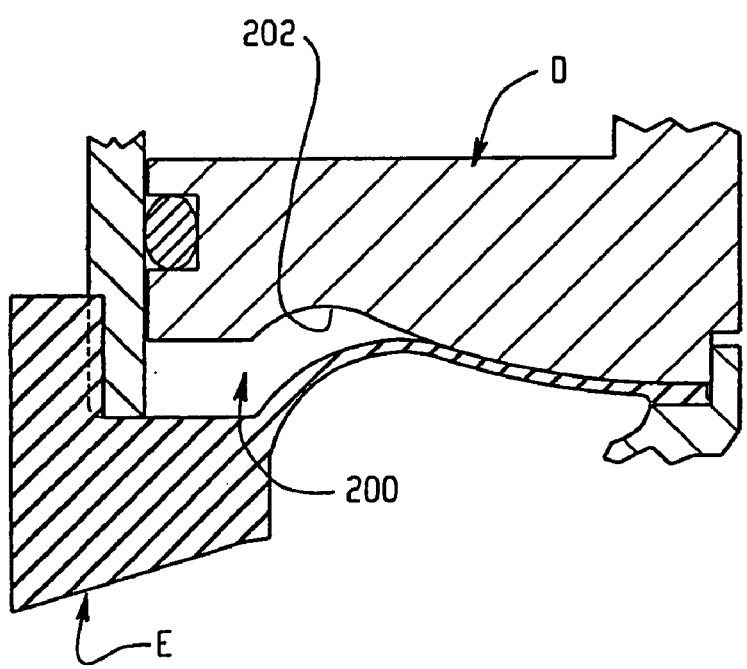
FIGS. 10A–10E illustrate various sized diaphragms in accordance with the present invention.
Figure 10B:
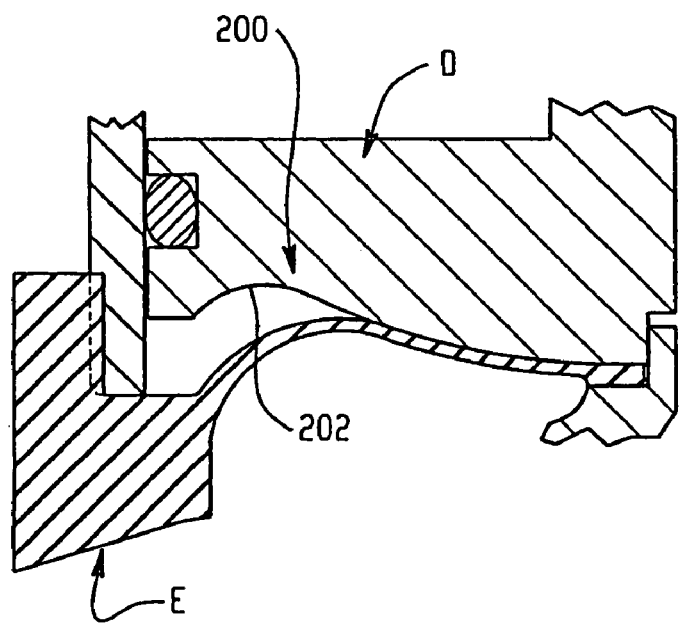
Figure 10C:
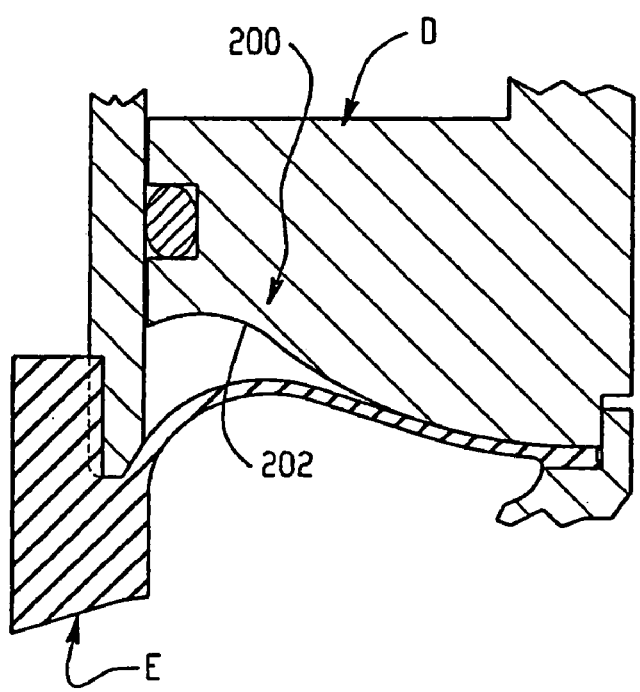
Figure 10D:
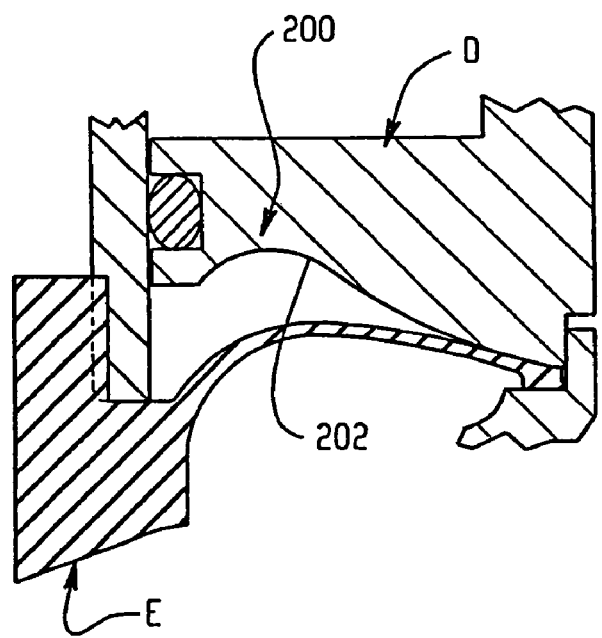
Figure 10E:
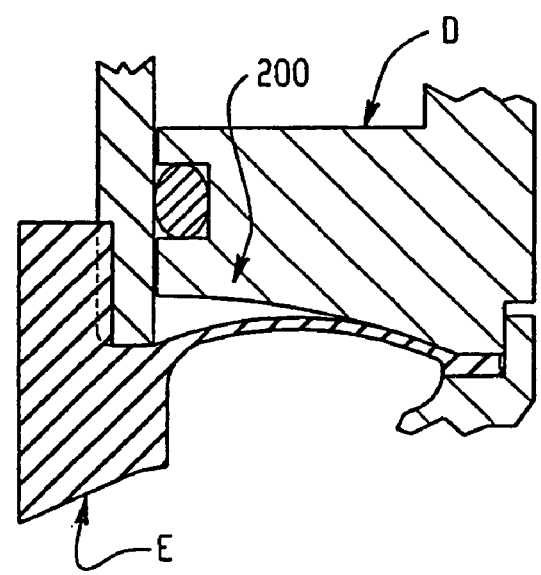

In the embodiments of FIGS. 9A–9C, the peripheral edge region 14 is formed with an upper notch or recess 96 formed in the rim 28. FIG. 9D shows an enlarged view of the notch 96. This notch 96 is preferably but not necessarily circumferentially continuous and uniform. The notch 96 defines a circumferential tab portion 98. The diameter of the tab 98 is selected to have a close or slip fit with the inner wall 64 of the valve body (FIG. 3) such that the tab 98 functions to accurately center the diaphragm E in the valve body F prior to clamping down the actuator housing D. The notch 96 allows the diaphragm E to deform in the region of 96 when the actuator housing D is over-torqued when joined to the valve body F. Without the notch 96, in some cases the diaphragm may deform in the region of 76 (FIG. 3) which would be less desirable for overall performance of the diaphragm. Thus, it is contemplated that the notch 96 can be a feature used with the various diaphragm designs illustrated and/or described herein.

Figure 11:
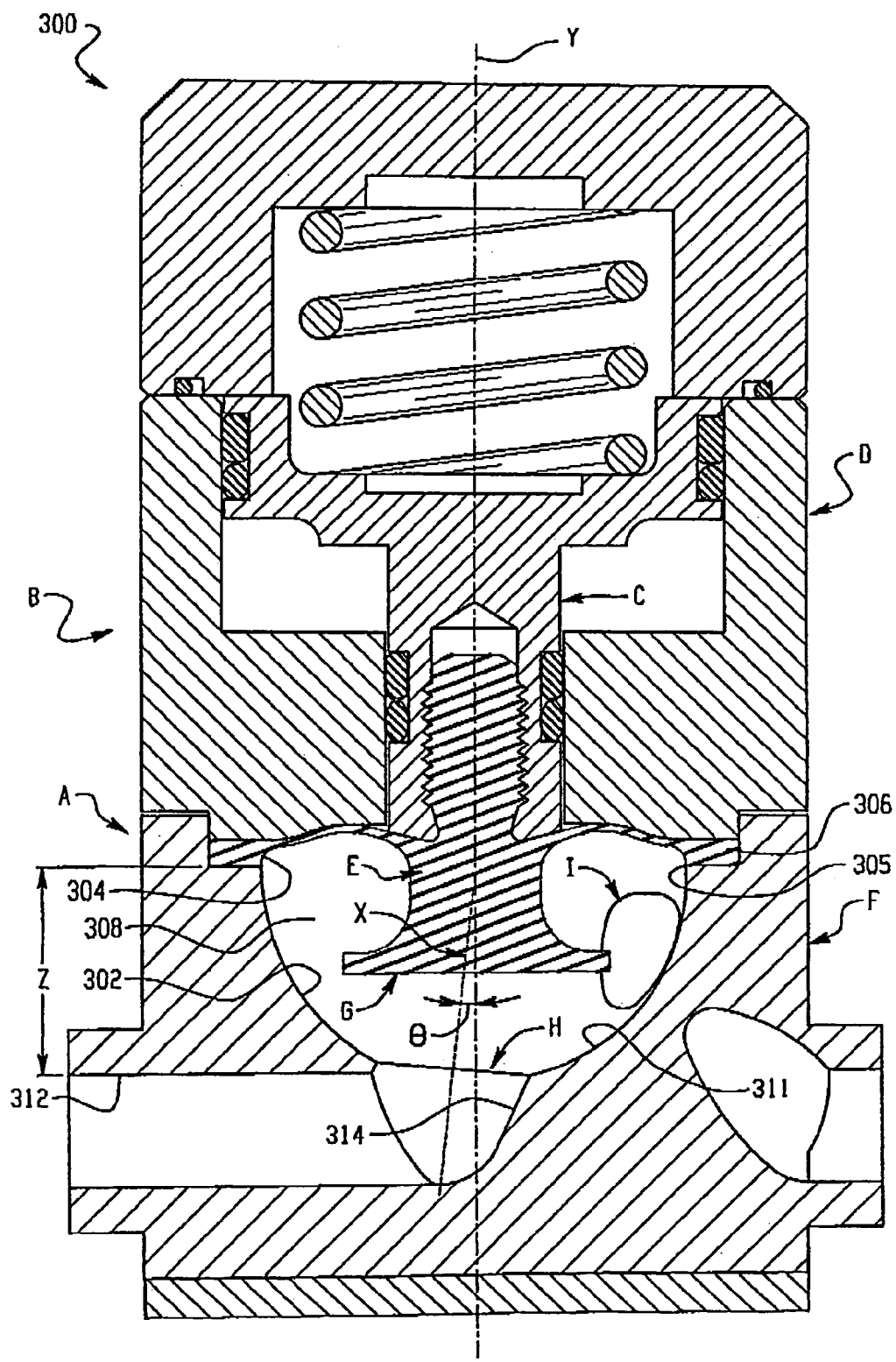
FIG. 11 illustrates a further embodiment of the invention using a deep bowl concept shown in vertical cross-section and in the valve open position.
Figure 12:
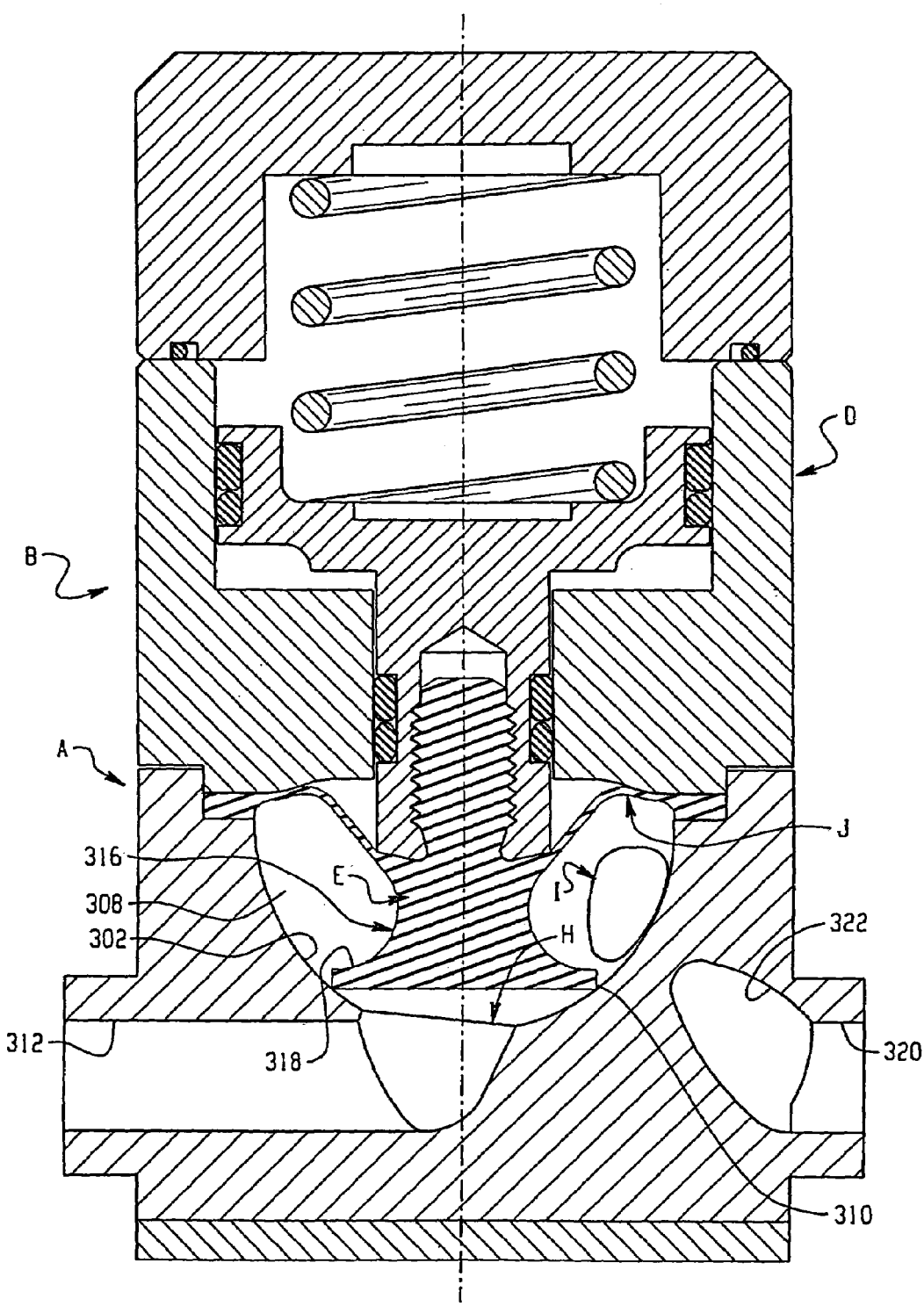
FIG. 12 illustrates the valve of FIG. 11 in the valve closed position.

With reference to FIGS. 11 and 12, one of the limitations in any radial diaphragm valve is the amount of stroke that needs to be applied to the diaphragm to open and close the inlet port. This arises in part from the fact that for increased stroke the diaphragm must be flexible, yet able to withstand the operating pressures of the fluid, particularly when the valve is in the closed position. Therefore, the stroke available to open the valve tends to be fairly limited, which in turn tends to reduce or limit the flow rate of the valve. In accordance with another aspect of the invention, FIGS. 11 and 12 illustrate another valve cavity design referred to herein as a deep bowl because the radius of curvature for the cavity is substantially less than the radius of curvature of the other embodiments described hereinbefore.

In FIGS. 11 and 12, the valve assembly 300 includes a valve A and a valve actuator B. In this embodiment the actuator B is an air actuator, however any suitable valve actuator may be used with the present invention. The valve actuator B includes an actuator piston C that axially moves within an actuator housing D to operate a diaphragm E in the valve body F. The diaphragm E includes a stem tip G that opens and closes a port H to open and close fluid communication between the first port H and a second port I. The valve can be operated with either port being the inlet port, although in most applications the first port H will be used as the inlet port.

The diaphragm E as shown is somewhat modified from the earlier embodiments described herein (and which will be explained in greater detail below), but the deep bowl concept may be used with any suitable diaphragm design. Furthermore, the invention may be realized for metal or plastic valves, including metal or plastic valve bodies and/or diaphragms. In accordance with the deep bowl aspect of the invention, the valve body F has a generally curvilinear valve cavity surface 302 therein that forms a valve cavity 308 that is sealed by the overlaying diaphragm E. Preferably but not necessarily the surface 302 is curvilinear and in the illustrated embodiment is spherical. Other geometric configurations may be used as required for a particular valve application, however, the spherical geometry is relatively easy to machine and provides a cavity profile that achieves the higher flow rate desired while maintaining excellent cleanability. In the exemplary embodiment of FIG. 11, the cavity surface 302 forms a substantially complete true hemisphere having a diameter that is about equal to the diameter of the diaphragm E formed by the inner edge 304 of the circumferential rim 306 (the circumferential rim 306 forms the body seal for the valve A when compressed against the annular seal surface or flat 60, see FIG. 4). For maximum cleanability it is preferred that after the valve actuator D and valve body F are fully assembled together that the edge 304 flushly join the surface 302 or with a slight overhang.

When the cavity surface 302 is substantially hemispherical there is no need for the transition portion 80 and more specifically the edge wall portion 78 that was described herein with reference to FIG. 3. This is because the hemispherical bowl surface 302 will join the diaphragm E at an interface 305 having a tangent that is substantially parallel to the axis Y.

The deep bowl concept may be realized with other cavity 308 geometric configurations besides a hemisphere. For example, the surface 302 may be defined by a parabolic or elliptical function. The surface 302 may also include a spherical or other curved portion and one or more cylindrical portions. The deep bowl concept therefore contemplates in more general terms any one or more of the following characteristics, namely, 1) a bowl depth dimension Z (FIG. 11) that is about one-half or less of the diameter of the diaphragm E at the inner rim 304; 2) a seal face diameter 310 (see FIG. 12 and the discussion thereof) that is about ⅝ or less than the diameter of the curved surface 302; and 3) a diaphragm E stroke that is about ½ or less of the diaphragm E radius at the inner edge 304. Although a bowl depth that is greater than or less than the radius of the diaphragm E may be used, additional machining will be required to form either straight cylindrical wall portions (when the depth is greater than the radius of the diaphragm) or preferably a transition 80, 78 to a near vertical portion may be used to assure optimum cleanability near the rim 28 (when the depth is less than the radius of the diaphragm E). In the case of a true hemisphere 302, the depth will be substantially the same as the diaphragm radius (within normal manufacturing tolerances).

The first port H opens to the valve cavity 308 near the bottom of the cavity opposite the valve actuator D. In accordance with one aspect of the invention, the diaphragm tip G has a diameter that is greater than the port H and seals in an area 310 of the bowl surface 302 that is substantially radially outside or spaced from the port H (see FIG. 12). Preferably, the tip G seals at a location that is radially between or about midway between the first and second ports H and I. The tip G may be provided with a convex radius or other contour (not shown) to effect a line seal. When used, the tip G radius should be greater than the radius of the cavity surface 302.

By having the tip G seal radially outside the first port H and in combination with the deep bowl design, when the diaphragm E is pulled away by the actuator stem C to open the valve, a substantially larger flow cross-sectional area opens to the port H. For example, a 2:1 ratio can be achieved between the cross-sectional flow area within the cavity 308 and the cross-sectional flow area of the flow bore 312. In other words, as compared to a shallow bowl design, the same amount of linear stroke of the actuator D presents a substantially larger cross-sectional flow area to the fluid from the first port H. The smaller diameter spherical design of the cavity 308 achieves a substantial non-linearly increasing cross-sectional flow area as the tip G is withdrawn from the port H to open the valve. A further enhancement for improving flow through the valve is to optimize the location of the valve stem tip G relative to the outlet port I. In other words, when the valve is in the open position, the stem tip G may be designed so as to deflect or assist in directing the flow from the first port H to the second port I. If the stem tip G is positioned too high relative to the port I flow path, turbulence may occur, and if the tip G is too low relative to the port I flow may be unnecessarily restricted. Preferably, the port I will be positioned as close to the port H as possible while allowing sufficient area for the tip G to seal substantially radially spaced from the port H. Also, in many cases it will be desirable to make the entry angle of the port I as shallow as posssible.

In accordance with another aspect of the invention, by providing the seal area radially outside the port H, the port H need not be centered exactly on a diametric line of the cavity 308. In other words, in a typical radial diaphragm valve, the port sealed by the diaphragm stem G is centered on an axis that is collinear with the translation axis of the stem G. This arises from the fact that the stem must seal at the port. In the present invention, however, more options are available for positioning the port H within the cavity surface 311 that lies between the port H and the seal area 310. For example, in FIG. 11 the first port H opens at a flow angle θ which is the included angle formed by a central axis X of the port and the translation axis Y of the stem tip G. Thus, the port H may open at an angle other than being centered on the translation axis Y. This allows for the elimination of a ninety degree elbow between the inlet passageway 312 of the valve and a bore 314 that forms the port H. Eliminating the ninety degree elbow improves flow rate and also improves drainage and cleanability.

In accordance with an additional aspect of the invention, the diaphragm stem G includes a radial undercut portion 316 (see FIG. 12). By radial undercut is simply meant that the stem has a greater diameter at the tip G then tapers inwardly along the stem until joining the web portion J of the diaphragm E. This undercut 316 thus provides a somewhat lateral circumferential surface area 318 opposite the tip G surface. This circumferential surface area 318 is thus exposed to any fluid back pressure from the second port I. This back pressure will thus tend to apply a force to the stem surface 318 when the diaphragm is in the closed position (FIG. 12) thus urging the valve closed. This force may easily exceed the force applied by the actuator B to close the valve against the fluid pressure at the port H thus helping to ensure a tight seal at 310 without the need for a high closing force actuator. In the specific case where the first port H is used as an inlet port and the second port I is used as the outlet port, the undercut stem permits the diaphragm valve to function as a check valve or relief valve because pressure from the outlet port I will close the valve by applying a force against the opposite surface 318. It will be appreciated that the opposite surface 318 formed by the undercut need not be perpendicular to the stem, but rather it is only necessary that the surface will exert an axial closing force on the stem tip G when exposed to fluid pressure from the second port I that is greater than the pressure at the port H.

Figure 13:
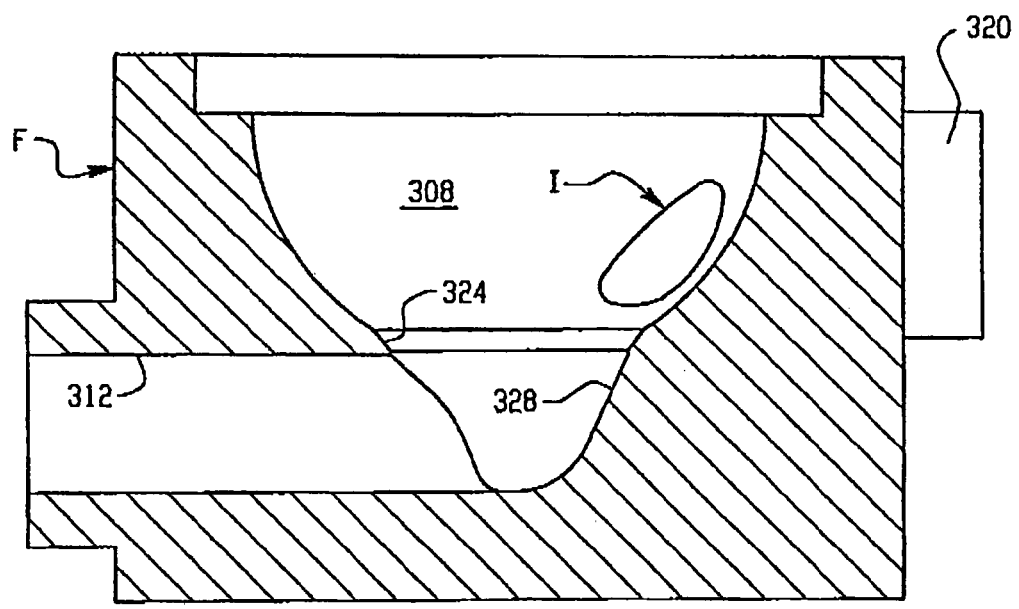
FIG. 13 illustrates an alternative embodiment at the valve body of FIG. 11, incorporating a conical fluid port.
Figure 14:
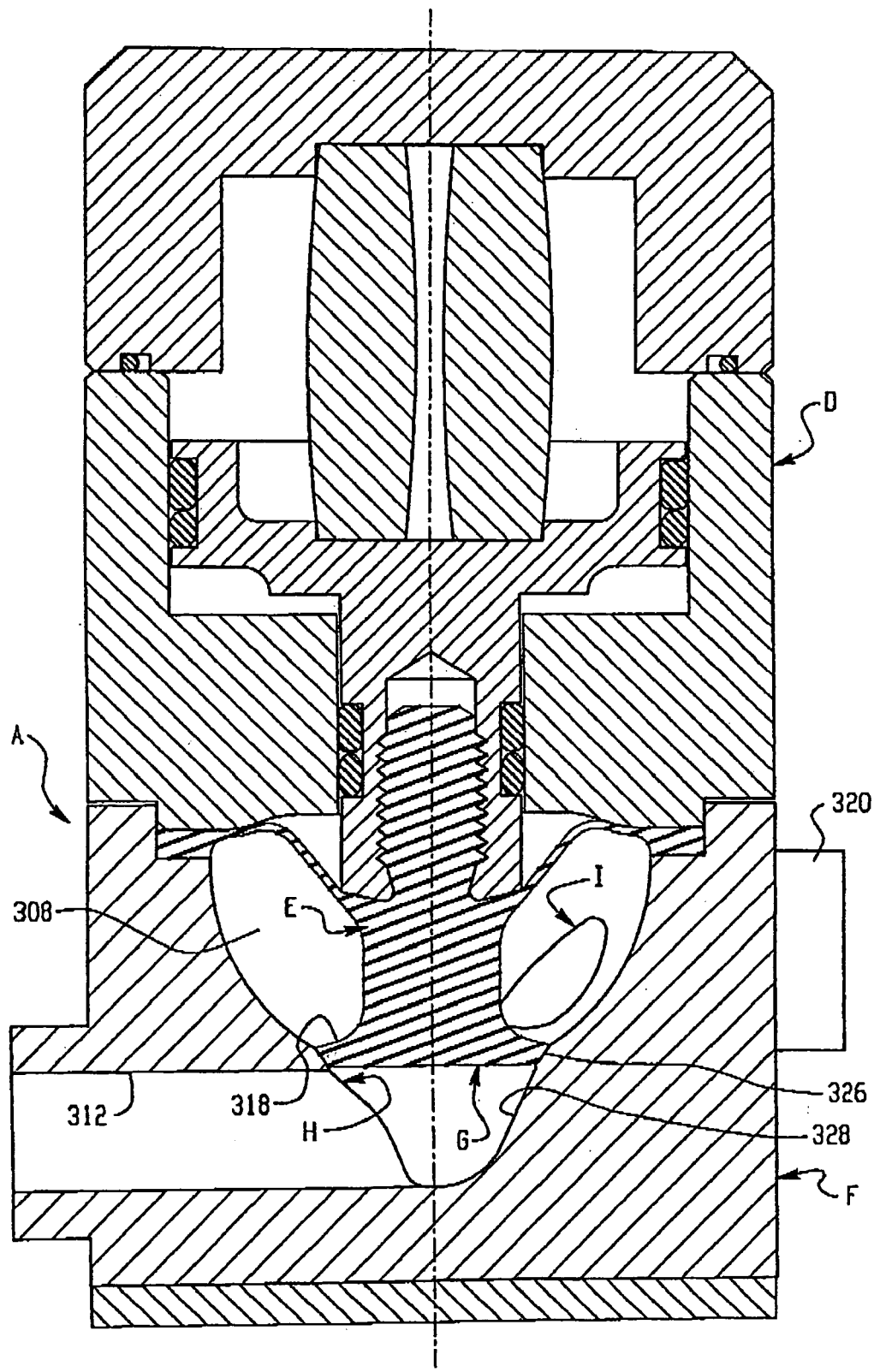
FIG. 14 illustrates the alternative valve design of FIG. 13 with the valve illustrated in the valve closed position.

In the embodiment of FIGS. 11 and 12, the first fluid passageway 312 is axially aligned with the second fluid passageway 320 to form an in-line valve body. The second fluid passageway then includes an angled portion 322 that opens to the port I such that the port I opens in an area above the seal area 310. FIG. 13 illustrates an alternative embodiment for an offset port arrangement. In this embodiment, the second fluid passageway 320 is formed generally in a parallel plane with the axial plane of the first fluid passageway but is not coaxial therewith, but rather is axially offset. The second fluid passageway 320 in this case opens straight to the second port I. As best illustrated in FIG. 14, the second port I in this case is also laterally offset from the stem tip G by opening somewhat tangentially to the valve cavity 308. In this manner, the fluid flow from the second port I when the second port is used as the inlet port is not directed at the diaphragm stem G and enhances a vortical flow around the spherical surface 302 to enhance cleaning and purging.

With continued reference to FIGS. 13 and 14, in this embodiment the first port H includes a chamfered valve seat 324. The diaphragm stem tip G is tapered as at 326 to provide an effective seal against the chamfered valve seat 324. The valve seat 324 provides for a radial seal adjacent the port H, as compared to the radially offset seal area 310 in the embodiment of FIG. 11.

Figure 15A:
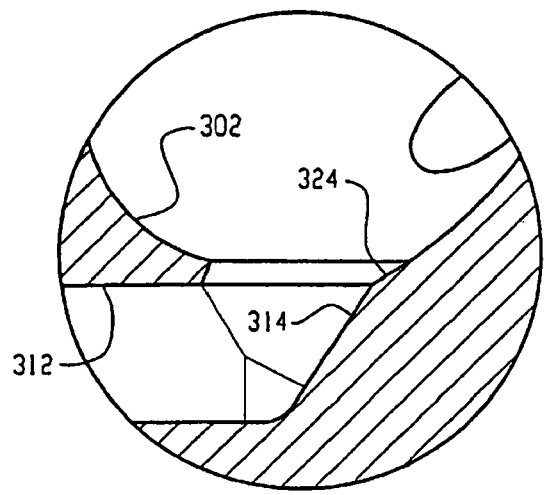
FIGS. 15A and 15B illustrate an alternative porting arrangement in which a chamfer is used adjacent a non-circular port.
Figure 15B:
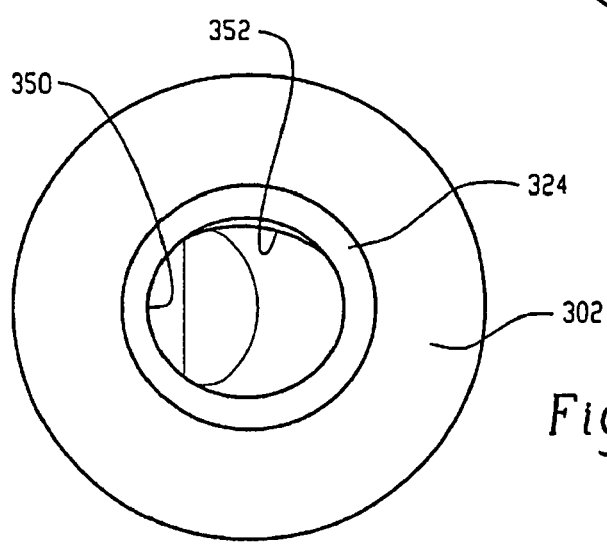

When the first port H is machined on any axis X other than the center bottom of the bowl (along axis Y), the port H will have a non-circular geometry, such as an ellipse, for example. FIGS. 15A and 15B illustrate this effect. In FIG. 15A, the angled bore 314 joins the inlet passageway 312. The angled bore 314 forms the port H by intersecting the spherical surface 302 at an angle (for example the angle θ of FIG. 11). The circular bore 314 thus forms an elliptical opening 350 (FIG. 15B) for the port H. The chamfer 324 is formed about the elliptical port 350 to provide a seal area for the stem tip G. Note that there will be a small step 352 formed at the juncture of the elliptical port and the chamfer 324, however, this step will be minimal and easily flushed. By providing the chamfered surface 324 adjacent the port H, the stem tip G can still be used to form a seal at the port H when such operation is required (as compared to sealing at a location 310 radially spaced from the port H) regardless of the entry angle θ.

Figure 16:
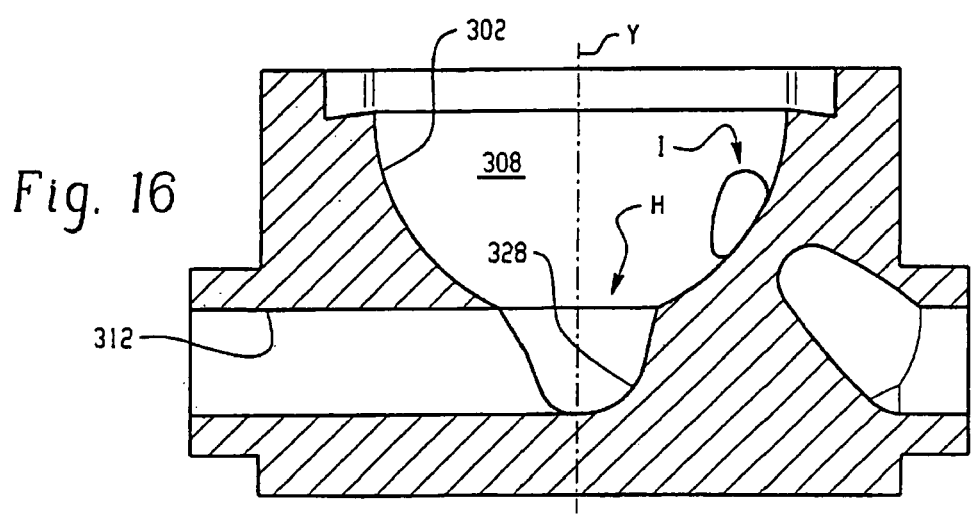
FIG. 16 illustrates another porting arrangement in which a conical bore is used to form one of the valve ports.

In accordance with another aspect of the invention illustrated in FIG. 16, the port H may be formed by machining a conical bore 328 that opens to the flow bore 312. The use of a conical bore 328 increases overall flow through the valve. The conical bore 328 may be centered on the axis Y or offset at an angle θ as required.

Those skilled in the art will appreciate that the various improvements and aspects of the present invention may be used individually or in various combinations with each other as required for a particular valve application.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A radial diaphragm valve comprising:
   a valve body having a valve cavity therein defined by a curved surface therein;
   a diaphragm having a perimeter that seals said valve cavity;
   a first fluid passage in said valve body that opens to said valve cavity at a first port and a second fluid passage in said valve body that opens to said valve cavity at a second port;
   said diaphragm having a central valve stem that opens and closes the valve;
   said valve stem being movable between a valve open and valve closed position along an axis;
   said valve stem in said closed position sealing against the curved surface at an area of sealing surrounding said first port, wherein the area of sealing is radially spaced from the first port by an unsealed area of the curved surface.

2. The valve of claim 1 wherein said curved surface substantially forms a hemispherical valve cavity.

3. The valve of claim 1 wherein said valve stem comprises a curved button that seals against said surface, said button having a radius of curvature greater than a radius of curvature of said cavity.

4. The valve of claim 1 wherein said curved surface is spherical with a radius of curvature about equal to a radius of said diaphragm.

5. The valve of claim 1 wherein linear displacement of said valve stem from said closed position to said opened position produces a non-linearly increasing flow cross-sectional area that is at least two times a flow cross-sectional area of said first fluid passage.

6. The valve of claim 1 wherein said first port opens to said valve cavity along a central flow axis that is angularly offset from a translation axis of said valve stem.

7. The valve of claim 6 wherein said first fluid passage comprises a first portion aligned transverse said valve stem translation axis and a second portion that opens to said valve cavity; said first and second portions forming an angle therebetween that is greater than ninety degrees.

8. The valve of claim 7 wherein said second portion comprises a conical bore.

9. The valve of claim 6 wherein said first port is elliptical.

10. The valve of claim 1 wherein said first and second fluid passages are generally co-axially aligned.

11. The valve of claim 1 wherein said first and second fluid passages are axially offset with respect to each other.

12. The valve of claim 1 wherein said second fluid passage opens tangentially to said valve cavity.

13. The valve of claim 1 wherein said second fluid passage opens to said valve cavity along a flow path that is laterally offset from said valve so that fluid flow into said valve cavity from said second fluid passage is along a flow path other than directly at said valve stem.

14. A radial diaphragm valve comprising:
a valve body having a valve cavity therein defined by a curved surface therein;
a diaphragm having a perimeter that seals said valve cavity;
a first fluid passage in said valve body that opens to said valve cavity at a first port and a second fluid passage in said valve body that opens to said valve cavity at a second port;
said diaphragm having a central valve stem that opens and closes the valve;
said valve stem being movable between a valve open and valve closed position along an axis;
said valve stem in said closed position sealing against the curved surface at an area of sealing surrounding said first port, wherein the area of sealing is radially spaced from the first port by an unsealed area of the curved surface, and wherein said valve stem has a diameter greater than the diameter of said first port.

15. A radial diaphragm valve comprising:
a valve body having a valve cavity therein defined by a curved surface therein;
a diaphragm having a perimeter that seals said valve cavity;
a first fluid passage in said valve body that opens to said valve cavity at a first port and a second fluid passage in said valve body that opens to said valve cavity at a second port;
said diaphragm having a central valve stem that opens and closes the valve;
said valve stem being movable between a valve open and valve closed position along an axis;
said valve stem in said closed position sealing against a portion of a surface surrounding said first port and radially spaced therefrom;
wherein said valve stem moves between a valve open and closed position along an axis, said valve stem comprises a seal surface and a top portion that extends laterally from said axis and forms a surface opposite said seal surface; said opposite surface when exposed to fluid back pressure from said second fluid passage urging said valve stem to said closed position.

16. The valve of claim 15 wherein said first fluid passage is a valve inlet and said second fluid passage is a valve outlet; the valve operating as a check valve.

17. A radial diaphragm valve comprising a valve body having a valve cavity with first and second ports therein, said cavity being defined by a hemispherical surface, and a diaphragm that seals one of said ports at a seal surface that is radially spaced from said one port by an unsealed area of the hemispherical surface.

18. The valve of claim 17 wherein said first port is elliptical.

19. The valve of claim 17 wherein said first port is formed by a conical bore.

20. The valve of claim 17, further comprising a chamfered annular value seat adjacent to said port.

21. The valve of claim 20, wherein the chamfered annular valve seat is circular.

22. A radical diaphragm valve comprising a valve body with a spherical valve cavity therein and a port that opens to said valve cavity; said port being elliptical and at least partially disposed on a central axis of the sperical valve cavity.

23. The valve of claim 22, wherein the port opens to a bottommost portion of the valve cavity.

24. A radial diaphragm valve comprising:
a valve body having a valve cavity therein defined by a curved surface therein;
a diaphragm having a perimeter that seals said valve cavity;
a first fluid passage in said valve body that opens to said valve cavity at a first port and a second fluid passage in said valve body that opens to said valve cavity at a second port;
said diaphragm having an actuator boss, a web portion, and an outer peripheral region, wherein said web portion connects to a central valve stem that opens and closes the valve;
said valve stem being movable between a valve open and valve closed position along an axis;
said valve stem in said closed position sealing against the curved surface at an area of sealing surrounding said first, wherein the area of sealing is axially spaced from the first port by an unsealed area of the curved surface.

25. The valve of claim 24 wherein linear displacement of said valve stem from said closed position to said opened position produces a non-linearly increasing flow cross-sectional area that is at least two times a flow cross-sectional area of said first fluid passage.

26. The radial diaphragm valve of claim 24 wherein said curved surface substantially forms a hemispherical valve cavity.

27. A valve body having a valve cavity; and a generally annular diaphragm valve body seal surface extending outward from an outer edge of the valve cavity; wherein said seal surface is declined from said outer edge at an angle from flat.

28. The valve body of claim 27 wherein said declined angle is approximately 3 degrees.

29. The valve body of claim 27 wherein said valve cavity forms a spherical surface.

30. A radial diaphragm valve comprising:
a valve body having a valve cavity therein defined by a curved surface therein;
a diaphragm having a perimeter that seals said valve cavity;
a first fluid passage in said valve body that opens to said valve cavity at a first port and a second fluid passage in said valve body that opens to said valve cavity at a second port;
said diaphragm having a central valve stem that opens and closes the valve;
said valve stem being movable between a valve open and valve closed position along an axis;
said valve stem in said closed position sealing against the curved surface at an area of sealing surrounding said first port, wherein the area of sealing is radially spaced from the first port by an unsealed area of the curved surface, and wherein said valve stem moves along an axis a predetermined stroke wherein said stroke is about half or less the radius of said diaphragm.

31. A diaphragm valve and actuator assembly comprising:
a valve actuator having a valve actuator stem;
a valve body having a valve cavity;
a valve diaphragm having a rim portion that seals the valve cavity, the diaphragm includes a web portion that extends from the rim portion to an integrally formed central stem that includes a sealing portion disposed on a first side of the web portion that seals against said valve body when the valve is closed and a threaded portion on a second side of the web portion that is assembled with the valve actuator stem to allow the valve actuator to operate the diaphragm in the valve body;
wherein the sealing portion of the central stem includes an undercut defined by a curved taper that extends radially inward of a radially outer surface defined by the assembled valve actuator stem and the threaded portion of the central stem.

32. The diaphragm valve of claim 31 wherein the undercut forms a lip at the end of the stem portion.

33. The diaphragm valve of claim 31 wherein said web portion is arcuate in shape.

34. The diaphragm valve of claim 31 wherein the central stem portion penetrates into the fluid passageway.

35. The diaphragm valve of claim 31 wherein the web portion has a non-uniform thickness along its radial extent between the central stem portion and the rim portion.

36. The diaphragm valve of claim 31 wherein the web portion gradually thickens as the web extends outward to the rim portion.

37. The diaphragm valve of claim 31 wherein an upper surface of the web portion is joined to the rim portion by a smoothly blended transition.

38. A diaphragm valve and actuator assembly comprising:
a valve actuator that includes:
an actuator housing;
a valve actuator stem that is axially moveable in the actuator housing; and
a diaphragm valve that includes:
a valve body that includes a cavity surface defined in the body that includes a cylindrical portion centered on an axis and a curved portion centered on said axis, the valve body includes a first fluid passage that opens at a first port that surrounds said axis and a second fluid passage that opens through the cavity surface at a second port that is spaced apart from said axis, the valve body includes a cylindrical bore that extends radially outward from the cavity surface and extends axially from the cavity surface to an end surface of the body;
a valve diaphragm having a rim portion disposed in the cylindrical bore to seal the valve cavity, the diaphragm includes a web portion that extends from the rim portion to an integrally formed central stem that includes a sealing portion disposed on a first side of the web portion that seals against said valve body when the valve is closed and a threaded portion on a second side of the web portion that is assembled with the valve actuator stem to allow the valve actuator to operate the diaphragm in the valve body;
wherein the sealing portion of the central stem includes an undercut defined by a curved taper that extends radially inward of a radially outer surface defined by the assembled valve actuator stem and the threaded portion of the central stem;
wherein a depth of the valve cavity is greater than a radius of an inner edge of said rim portion of the valve diaphragm.

* * * * *

UNITED STATES PATENT AND TRADEMARK OFFICE
CERTIFICATE OF CORRECTION

| | | |
|---|---|---|
| PATENT NO. | : 7,364,132 B2 | Page 1 of 1 |
| APPLICATION NO. | : 10/109413 | |
| DATED | : April 29, 2008 | |
| INVENTOR(S) | : Ronnie A. Browne et al. | |

It is certified that error appears in the above-identified patent and that said Letters Patent is hereby corrected as shown below:

Column 14, line 23, (claim 22) the word "radical" should read --radial--.

Signed and Sealed this

Fourteenth Day of October, 2008

JON W. DUDAS
*Director of the United States Patent and Trademark Office*